(12) United States Patent
Mumford

(10) Patent No.: US 6,377,249 B1
(45) Date of Patent: Apr. 23, 2002

(54) ELECTRONIC LIGHT PEN SYSTEM

(75) Inventor: John R. Mumford, Mississauga (CA)

(73) Assignee: Excel Tech, Mississauga (CA)

(*) Notice: Subject to any disclaimer, the term of this patent is extended or adjusted under 35 U.S.C. 154(b) by 0 days.

(21) Appl. No.: 09/188,674

(22) Filed: Nov. 9, 1998

Related U.S. Application Data

(60) Provisional application No. 60/065,290, filed on Nov. 12, 1997.

(51) Int. Cl.$^7$ .................................................. G09G 5/00
(52) U.S. Cl. ........................ 345/179; 345/180; 345/182; 345/173
(58) Field of Search ................................ 345/179, 180, 345/181, 182, 183, 173, 174, 175, 176, 156, 157; 178/18.01, 18.09, 18.1, 19.05, 19.04, 20.03

(56) References Cited

U.S. PATENT DOCUMENTS

| | | |
|---|---|---|
| 4,318,096 A | 3/1982 | Thornburg et al. |
| 4,405,921 A | 9/1983 | Mukaiyama |
| 4,521,773 A | 6/1985 | Lyon |
| 4,691,199 A | 9/1987 | Shell |
| 4,705,942 A | 11/1987 | Budrikis et al. |
| 5,347,110 A | 9/1994 | Audebert et al. |
| 5,420,607 A * | 5/1995 | Miller et al. ............... 345/156 |
| 5,477,012 A | 12/1995 | Sekendur |
| 5,502,514 A * | 3/1996 | Vogeley et al. ............. 345/179 |
| 5,642,161 A | 6/1997 | Jefferson |
| 5,646,650 A | 7/1997 | Miller et al. |
| 5,675,129 A | 10/1997 | Burns et al. |

* cited by examiner

*Primary Examiner*—Xiao Wu
(74) *Attorney, Agent, or Firm*—Marks & Clerk

(57) ABSTRACT

An electronic light pen used in conjunction with a video display permits the position of the light pen to be determined with respect to the video display by the particular color or grey scale value of light emitted by the video display and received by the electronic light pen. The light from the video display is separated into three primary colors for a color display, namely red, blue, and green, and separated into grey scale shades for a monochrome display. Positional information of the light pen is calculated based on the relation of the color measured to the color previously programmed and presently displayed on that area of the screen, at any instant in time. The light pen has a focusing system that focuses light from the display to its optical detectors. The optical detectors have red, green, and blue filters to determine the brightness of each color. A grey scale value may be determined if the display is monochrome. An optional telephoto lens attachment allows the light pen to be aimed at displays from a distance, or to be used with projection displays. A display can be written with color information to preprogrammed locations on the screen. The colors at each area of the display can be unique, at any instant in time. When that color is read by the light pen the position may be accurately determined. A colored arrow, or other pointer, similar to a conventional mouse pointer, may be created by using software and may be continuously re-displayed to follow the light pen as it points to different parts of the screen, by determining the color gradient encountered by the light pen and re-positioning the arrow underneath the tip of the pen.

39 Claims, 13 Drawing Sheets

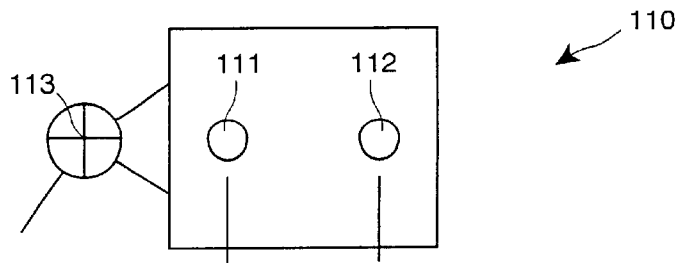
Figure 11
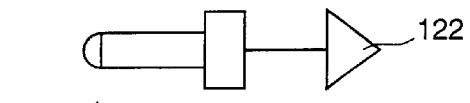
Figure 12A
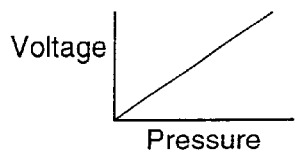
Figure 12B
Figure 12C
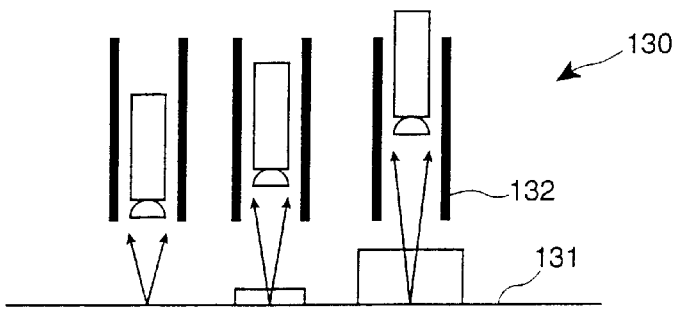
Figure 13

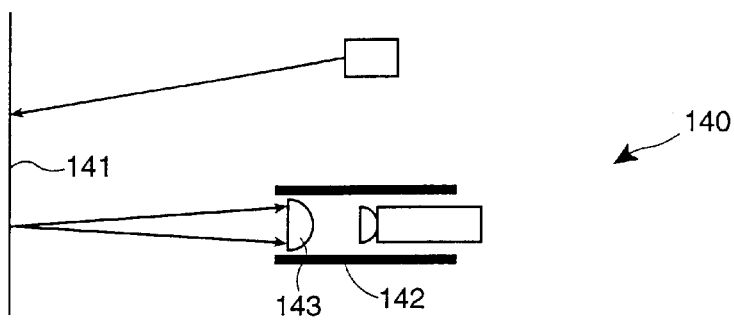
Figure 14
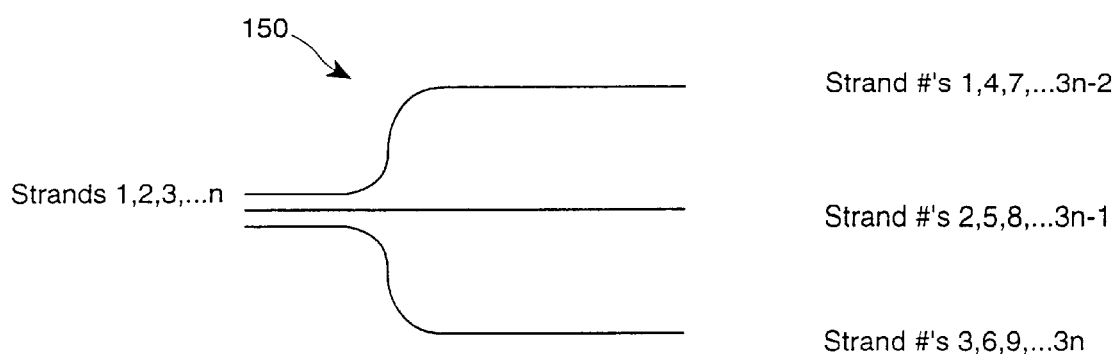
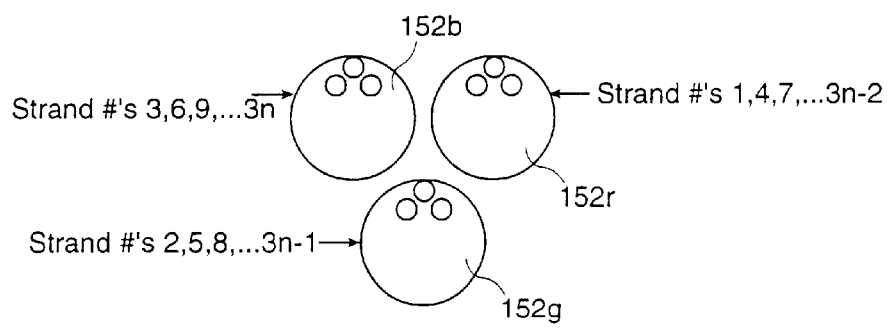
Figure 15

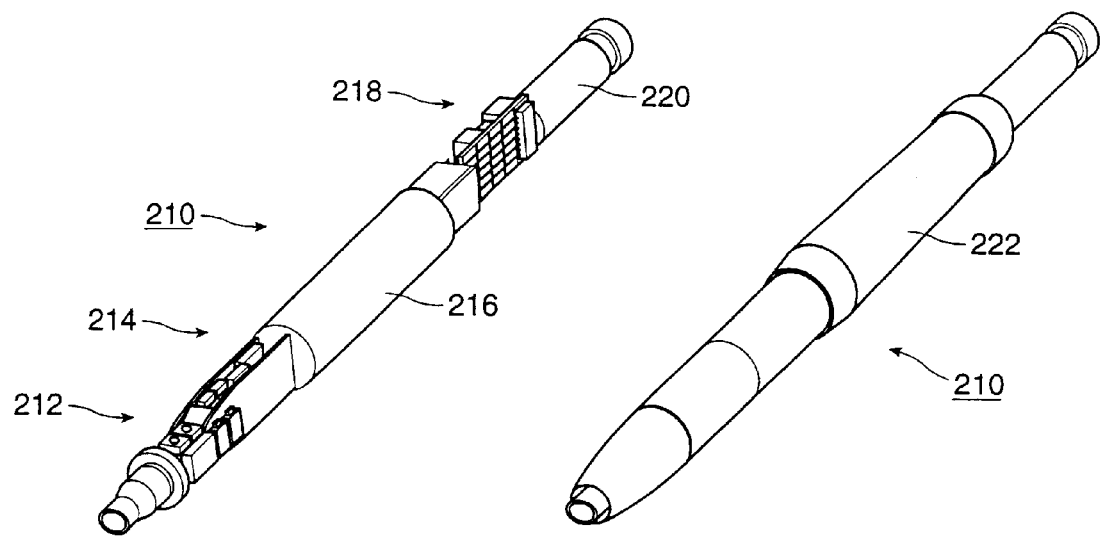
Figure 21  Figure 22
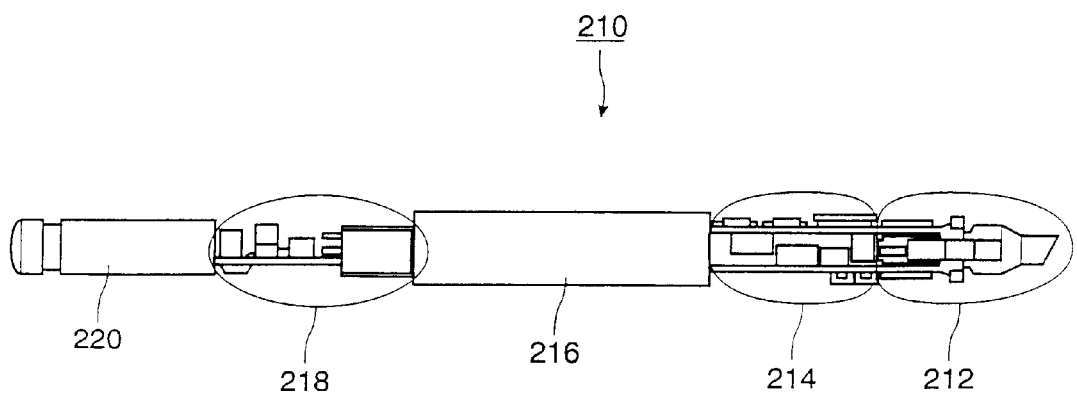
Figure 23

ELECTRONIC LIGHT PEN SYSTEM

This application claims benefit of Prov. No. 60/065,290 filed Nov. 12, 1997.

FIELD OF THE INVENTION

This invention relates to computer screen displays and electronic light pens for use therewith. Specifically, this invention relates to light pens that use the light emanating from a display screen, such as a computer screen, television, or LCD display, to determine the position of the tip of the light pen with respect to the display screen.

BACKGROUND OF THE INVENTION

Pointing devices of various types are used in almost every computer application today. The popularity of graphic based operating systems such as those popularly employed by Apple Corporation or by the various manufacturers of computers using WINDOW™ operating systems, have resulted in the development of a number of pointing devices to be used in conjunction with the display screen of the computerized device. Some of the pointing devices that have been developed and popularized include:

(1) a mouse;
(2) a trackball;
(3) a transparent-touch screen that overlays the display including resistive and capacitive types;
(4) pressure, capacitive, resistive, or thermal sensitive tablet separate from the display;
(5) beam-breaking detectors surrounding the display;
(6) a light pen based on detection of the raster scan timing of the phosphor refresh beam;
(7) a stylus that incorporates pressure transducers; and
(8) a pen using ultrasonic, stereo tactic or radio frequency triangulation methods.

The various devices developed to position a pointer on a computer screen operate in conjunction with the application software on the computer using an appropriate "driver". Most such drivers try to emulate the conventional X/Y roller "mouse" which is very commonplace. Typically, only positional information is fed to the application software that controls the position of the pointer on the screen.

Light pens operate through use of a photo-detector typically located adjacent to the tip of the pen. Typically, the position of the pen with respect to the computer display is determined by timing the response of the photo-detector with the horizontal and vertical retrace of the display. The very high energy phosphor refresh beam illuminates the photodiodes substantially above the ambient screen brightness level. By reading a counter synchronized to the timing of the refresh beam, the position of the photo detector may be determined with a quite reasonable degree of accuracy. Unfortunately, the sampling rate is determined by the screen refresh rate; and accordingly, the sampling rate is quite limited as typical screen refresh rates are less than one hundred cycles per second—usually, between 60 and 72 hertz. That means that very fine movement of the light pen, or continuous movement such as in handwriting, may be undetected or only approximated.

Further, light pens are completely ineffective with liquid crystal displays. Also, present light pen technology requires expensive counters and additional circuitry to be effective with television displays, projection displays, and passively lit technologies.

Another prevalent problem is that external sensors are required for many of the above listed prior art pointing devices. Touch screens are expensive and bulky in contrast to the market's desire for small, inexpensive and portable touch screen systems.

Touch screens and tablets are limited in resolution to the sensor resolution. Typically, touch screens and tablets have a resolution that is much more coarse than the screen resolution of the computer for which they are acting as an input device, and accordingly the full resolution of the display is not taken advantage of. Also, touch screens and tablets have a scan matrix speed limitation similar to a computer keyboard.

A pressure sensitive writing tablet also has the additional limitation or disadvantage of being physically separated from the display screen of a computer. Accordingly, it is not possible to visually fixate on the writing tablet, where writing is taking place, and also visually fixate on the display screen, where the end result of the writing is being displayed, at the same time. It is therefore not possible to produce completely natural writing with a pressure sensitive writing tablet.

One example of the limitations of presently available prior art pointing devices can be found in modern electronic medical devices. Use of electronic patient records is becoming increasingly popular in modern medicine. Many of the devices and methods that are presently used rely on original paper-based technology—that is to say, paper printouts are relied on so that doctors can examine and write on the paper printouts. Two specific examples of state of the art medical technology that are still primarily paper based include EEG (electroencephalography) and ECG (electrocardiography) systems. Large numbers of EEG, ECG, and other paper records are generated every day in hospitals, doctors' offices, and clinics throughout the world. The electronic instrumentation and data are computerized, but physicians typically are much more comfortable holding a piece of paper in their hands. This is disadvantageous for EEG and ECG situations in particular, as physicians typically annotate these records at points of interest on the paper record, and include these marked up copies as part of a patient's record. Electronic systems exist at a basic stage, where various charts, data, pictures, and the like, are displayed on a color display screen; however, it is necessary to use a mouse and keyboard input devices of a computer to input information and generally annotate the records. While such a computer system might be efficient for someone who can type and is familiar with computer operating systems, it is difficult to operate efficiently for individuals who cannot type and who are not familiar with computer operating systems. Further, for physicians who are accustomed to using paper charts, it has been found that it is difficult to convert them to using an electronic system, especially if they are not particularly skilled at typing and using computer operating systems.

It is an object of the present invention to provide a light pen device that provides a more natural method of interacting with a computerized device.

Prior Art

Known prior art, which describes previous devices having, in each case, at least some of the shortcomings discussed above, includes the following United States patents:

U.S. Pat. No. 4,318,096, issued Mar. 2, 1982, to THORNBURG et al, discloses a graphics pen for soft displays, wherein a graphics input device is used with location indicating means to present graphic data upon a computer controlled visual display. The device includes a pen having a housing, within which housing is a conductive stylus shaft, one end extending beyond the housing to serve as the writing tip. A cylindrical off-axis pressure transducer encircles a portion of the stylus shaft within the housing, adjacent its writing end, for generating a variable output electrical signal proportional to the variable off-axis force applied to the stylus independently of the rotational orientation of the pen. A display processing and control system receives the variable signals and modifies a visual characteristic of the graphic data in response thereto.

U.S. Pat. No. 4,405,921, issued Sep. 20, 1983, to MUKAIYAMA, discloses a liquid crystal display device including a liquid crystal panel and a pen. The liquid crystal panel includes a plurality of display dots defined by spaced electrodes having a twisted nematic crystal therebetween. The display dots are selectively driven by a drive circuit between light-transmissive and non-transmissive states in a predetermined flickering timing. The light pen selectively directs light to the display dots which is caused to flicker thereby. The flickered light is detected by a sensor in the light pen and produces positioning data signals representative of the sequence of dots selected.

U.S. Pat. No. 4,705,942, issued Nov. 10, 1987, to BUDRIKIS et al, discloses a pressure sensitive light pen including a transparent rod at its pointing, through which light is directed to a photodetector that is fixedly positioned within the light pen. The rod is spring loaded and axially slidable in response to applied pressure, resulting in different light intensities being applied to the photodetector and further resulting in an output voltage generated by the photodetector, which output voltage is directly related to the applied pressure.

U.S. Pat. No. 5,646,650, issued Jul. 8, 1997, to MILLER et al, discloses an electronic paintbrush and color palette which allow a user to generate images on a CRT screen in a manner which imitates traditional painting with paints on a canvas. The electronic paint brush has fibre optic bristles which channel light from a CRT screen to optical detectors. A microprocessor in the brush utilizes pulses generated by the incidence of the raster scan on photodiodes to determine the position of the brush, the pressure of the brush on a CRT screen, and its angular orientation about the longitudinal axis of the brush. There is absolutely no co-relation between the color of the light received by the brush and the subsequent position of the brush while painting on the screen. The microprocessor utilizes color information generated by a CCD array to determine the area of contact of the brush with color swatches on the palette, and the angle between the longitudinal axis of the brush and the normal vector to the CRT screen. There is absolutely no co-relation between the color of the light received by the brush and the subsequent position of the brush while painting on the screen. In an alternative embodiment, the palette is also displayed on the CRT screen.

A position sensing system that is used is used to determine the track of an element over a pattern sequence is taught in BURNS et al U.S. Pat. No. 5,675,129, issued Oct. 7, 1997. Here, a sensing head or element is movable relative to a pattern which has pattern features that are established in respect of differences among the pattern features in directions which are parallel to a predetermined axis. A windowing property is thereby established; and, by sensing the pattern features traversed by the sensing element and comparing window-length portions of the succession of features with a stored representation of the overall series of features, it is possible sooner or later to detect an initial location of the element along the series of patterns. Having eventually detected the initial location of the element, further movement of the element can then be tracked incrementally. The initial track portion of the element can be back-tracked.

U.S. Pat. No. 5,477,012 issued Dec. 19, 1995 to SEKENDUR, teaches a co-ordinate sensor for detecting the position of a movable detector relative to a data-space which is coded with coordinate information. The coordinate information is detected and processed by the movable detector; however, the data-space must be preformatted with very complicated codes by which the coordinates of any point in the data-space can be determined. The detector detects the code, and thus the position of the detector in the data-space is determined. Thereafter, angular, rotational, or linear motion of the detector element may be determined, such as by handwriting on the coded tablet, on which additional handwritten data may be inscribed.

Each of SHELL U.S. Pat. No. 4,691,199 issued Sep. 1, 1987 and LYON U.S. Pat. No. 4,521,773 issued Jun. 4, 1985 teaches a type of hand held mouse which can be used to control the position and movement of an on-screen curser. In each case, a mouse-like object having a light source and a light detector are employed. In the case of SHELL, the mouse is moved over a tablet having an encoded grey scale imprinted thereon, so that movement from one area having a particular grey scale to another area having a different grey scale can be detected, decoded, and utilized so as to cause corresponding movement of the on-screen computer curser. In the LYON device, specific bit map images are determined, by way of a contrasting pattern which comprises a plurality of features on a contrasting background, over which the mouse is moved.

BRIEF DESCRIPTION OF THE DRAWINGS

The novel features which are believed to be characteristic of the present invention, as to its structure, organization, use and method of operation, together with further objectives and advantages thereof, will be better understood from the following drawings in which several preferred embodiments of the invention will now be illustrated by way of example. It is expressly understood, however, that the drawings are for the purpose of illustration and description only and are not intended as a definition of the limits of the invention. Embodiments of this invention will now be described by way of example in association with the accompanying drawings in which:

FIG. 11 is a simplified pictorial representation of an embodiment which employs a plurality of color light pens of the present invention to determine rotation of a tablet pointing device;

FIG. 12A is a simplified pictorial representation of an embodiment of the color light pen of the present invention having a transducer therein;

FIG. 12B is a graph indicating pen pressure on a display screen;

FIG. 12C is a diagram showing line width of a line displayed on a screen according to the pen pressure shown in the graph of FIG. 12B;

FIG. 13 is a simplified pictorial representation of a first embodiment of a focal length adjustment mechanism of an electronic light pen system of the present invention;

FIG. 14 is a simplified pictorial representation of a second embodiment of a focal length adjustment mechanism of an electronic light pen system of the present invention;

FIG. 15 is a simplified pictorial representation of a first embodiment of a light pipe having an arrangement of fibre optic strands;

FIG. 21 is a perspective view of the internal construction of a contemplated commercial embodiment of an electronic color light pen in keeping with the present invention;

FIG. 22 is a view similar to that of FIG. 21, showing the external shell of a contemplated commercial embodiment of an electronic light pen in keeping with the present invention;

FIG. 23 is a schematic representation of the embodiment of FIG. 21;

DETAILED DESCRIPTION OF THE PREFERRED EMBODIMENTS

Any of the prior art pointing devices and methods are viable in certain circumstances. The color pen of the present invention can actually replace all known prior art pointing devices in most or all circumstances, and can offer significant performance improvements in may respects in most cases.

Figure 1:
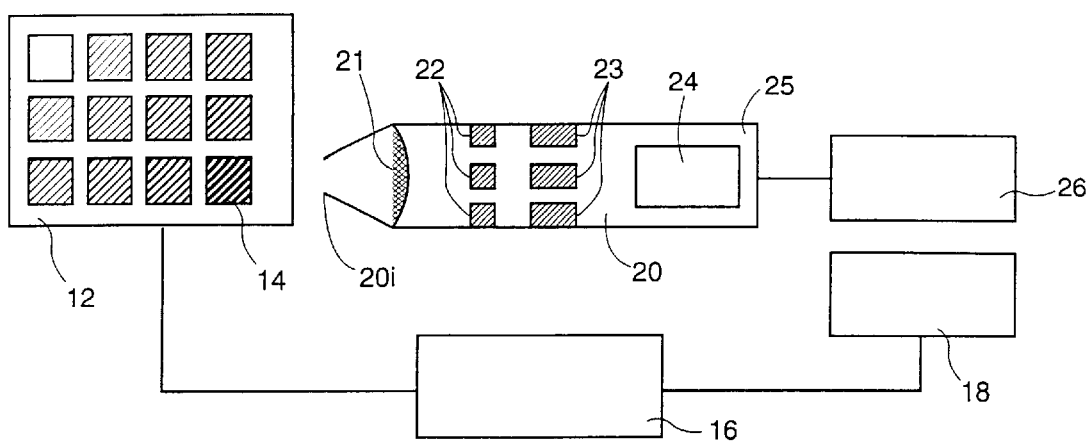
FIG. 1 is a simplified pictorial representation of a typical embodiment of the electronic light pen system of the present invention.
Figure 2:
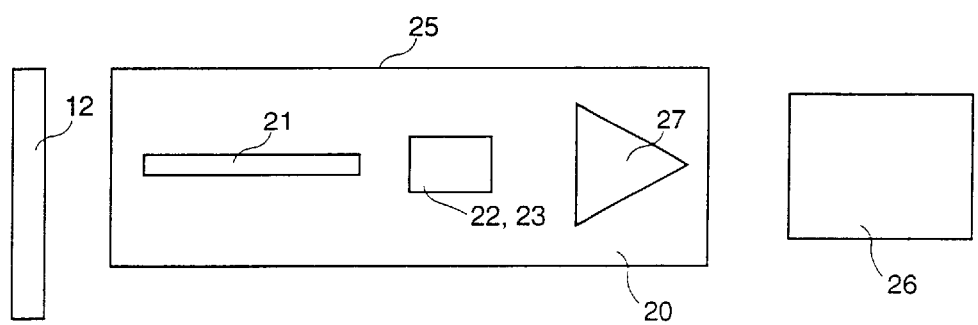
FIG. 2 is a simplified pictorial representation of the assembly of an electronic light pen of the present invention.
Figure 20:
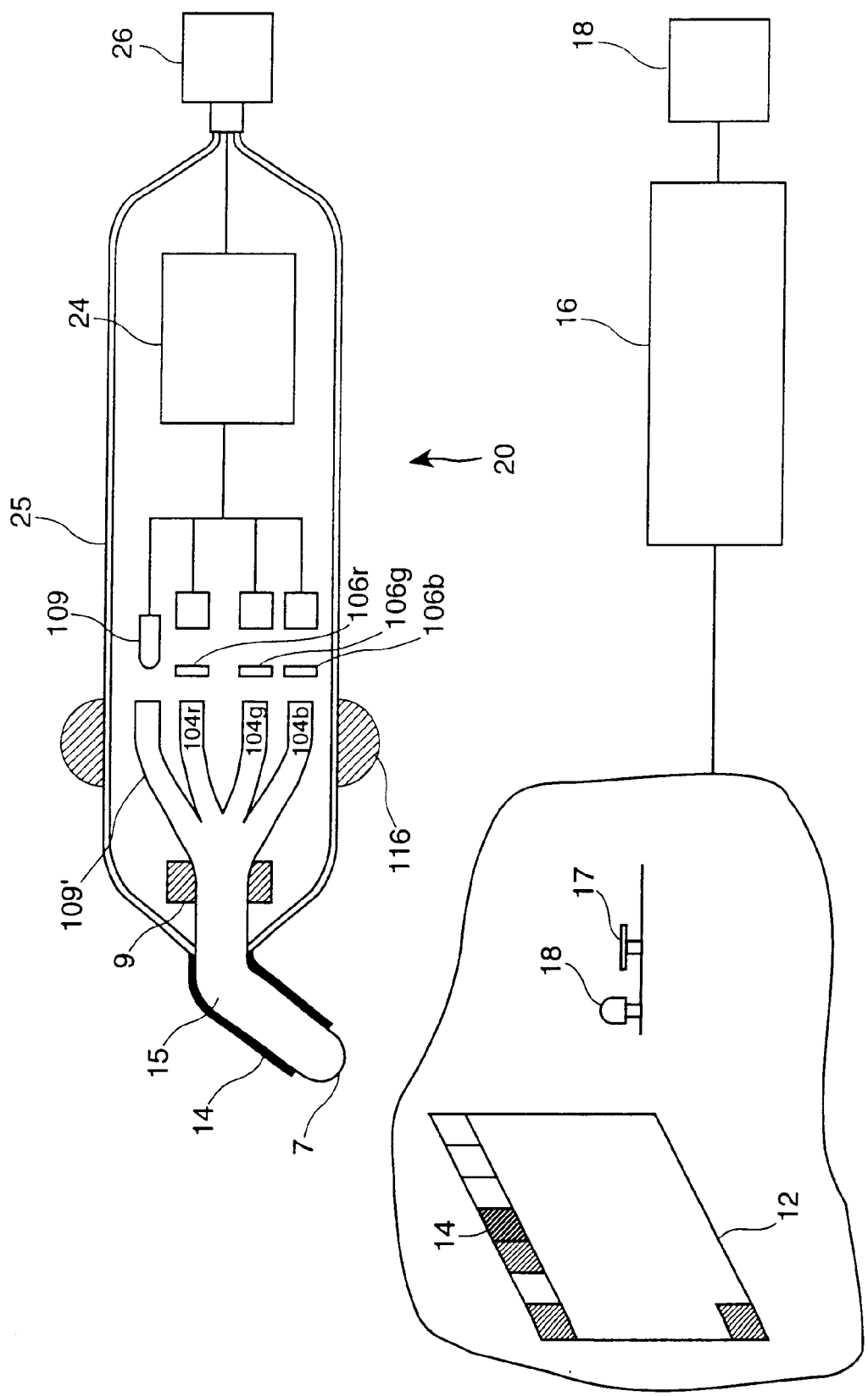
FIG. 20 is a simplified pictorial representation of an electronic light pen system of the present invention.

Reference will now be made to FIGS. 1, 2, and 20, which generally show a typical configuration of the electronic light pen system of the present invention, as indicated by the general reference numeral 10. The electronic light pen system 10 comprises a display screen 12 displaying a plurality of pixels 14, a representative sample of which is shown. Each of the pixels 14 is of a known overall color, which known color comprises known levels of luminance of red, green, and blue. Alternatively, each pixel is of a known, distinct, and unique luminance value—in other words, it has a known grey scale value. The display screen 12 is connected in operative relation to a computer 16. A data transfer device 18 is also conducted in data transfer relation to the computer 16. The display screen 12 may be of various types including a cathode ray tube, a liquid crystal display, a projection type display, a conventional television, a plasma display, or an electroluminescent display, and so on. For example, large screen displays, and displays which are found in public or commercial places, for example, but which function as a video display screen include light emitting diode driven displays—displays that have a plurality of light emitting diodes arranged in typical red/green/blue patterns—and multi-lamp driven displays of the sort which most often would be found in sports stadiums and the like—which comprise groups of small, high-intensity lamps arranged in typical red/green/blue arrays.

The electronic light pen 20 comprises light gathering optics 21 disposed at the input end 20i of the 20, which light gathering optics 21 may be in several forms, as will be discussed in greater detail subsequently. A red filter 22r, a green filter 22g and a blue filter 22b are disposed within the electronic light pen 20 immediately after the light gathering optics 21. The red, green, and blue filters 22r, 22g, 22b filter out light other than that of the specific wavelength of the filter such that the filtered light can pass through to corresponding photo sensitive detectors 23r, 23g, 23b. The photo sensitive detectors 23r, 23g, 23b are connected in electrically conductive relation to electronic circuitry 24, which will be discussed in greater detail subsequently. The light gathering optics 21, the red, green, and blue filters 22r, 22g, 22b, the photo sensitive detectors 23r, 23g, 23b, and the electronic circuitry 24 are operatively mounted within a case 25.

The electronic light pen 20 is connected in data transfer relation to a data transfer device 26 that receives data from the electronic light pen 20 and transfers it to the data transfer device 18. The data transfer device 26 and the data transfer device 18 could each be a fast serial port, or a parallel port, or such as a universal serial bus (USB) port, or the data can be transferred through wireless methods, or infrared, among other means. The data transfer device 18 in turn transfers the data to the computer 16. The computer 16 interprets this input data, which represents the position of the electronic light pen 20 with respect to the display screen 12. The computer 16 may update the pixels 14 of the display screen 12 depending on the data received ultimately from the electronic light pen 20, as discussed hereafter.

The color of any pixel, or group of pixels, depending on the resolution of the electronic light pen 20, can be determined from the display screen 12 by holding the input end 20i of the electronic light pen 20 to the display screen 12. The photo sensitive detectors 23r, 23g, 23b will produce an output voltage or current proportional to the intensity of the color of the pixels which are in front of the input end 20i of the electronic light pen 20. The output voltage or current is received by an analog to digital converter 27, which is part of the electronic circuitry 24, so as to produce a digital value, which digital value is logged into the software of the computer 16. Each of the pixels 14 on the display screen 12 has a unique color assigned to it by the software. Such a one to one mapping of unique color and positioning on the display screen 12 can provide a precise co-ordinate location. Depending on the quality of the light gathering optics 21, the red, green, and blue filters 22r, 22g, 22b, and the photo sensitive detectors 23r, 23g, 23b, it is possible to achieve single pixel measurements, but useful measurements can be made by using lesser quality components. If a three color system is used, such as red, green, and blue, a resultant color can be calculated. Further, only one of the three colors needs to be measured in order to output an intensity value. Still further, a grey scale sensor could be constructed using a single photodiode or other light sensitive device.

Moreover, it will be evident that sampling the color or luminance of any pixel or group of pixels by the electronic light pen 20 is independent of the refresh rate of the display screen 12, and is determined by the sampling rate at which readings by the electronic circuitry 24 from the photosensitive detectors 23r, 23g, 23b, are made. That sampling rate could be at least an order of magnitude higher, such as 1,000 hertz, and up to as high as 100 KHz. Thus, if the light pen 20 is moved, in keeping with one aspect of the invention as discussed hereafter, even very slight movement of the light pen 20 can be detected and determined. Since the computer 16 may update the pixels 14 of the display screen 12 as a consequence of the data received from the electronic light pen 20, it is therefore possible—since the position of the light pen 20 with respect to the display screen 12 is known at any instant in time—to follow the motion of the tip of the light pen and to display the track of the tip of the light pen on the display screen. Thus, handwritten notes can be inscribed directly onto the video display screen, which handwritten notes might then be captured at the option of the operator simply be invoking screen capture software.

Figure 3:
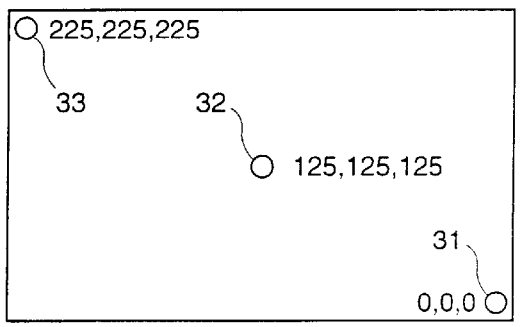
FIG. 3 is a simplified pictorial representation of a display screen having a color gradient displayed thereby.

Reference will now be made to FIGS. 3 through 7 to illustrate the basic operation of the electronic light pen system 10 of the present invention. As can be seen if FIG. 3, in an RGB monitor, each color in the visible spectrum can be created by combining the RGB values appropriately, with black being 0,0,0—that is to say, zero intensity of red, zero intensity of green, and zero of blue—and white being 255,255,255 (in an eight bit system). A color gradient displayed on the screen, with black being in the lower right corner and white being in the upper left corner could have the form as shown in FIG. 3, where three pixels are shown. Pixel 31 is black and has RGB values of 0,0,0. Pixel 32 is medium grey and has RGB values of 125,125,125. Pixel 33 is white and has RGB values of 255,255,255. Each pixel on the screen would have its own unique and distinct RGB values which could be read by the electronic light pen 20 and converted to a corresponding unique digital value by the analog to digital converter 27, which is ultimately transferred into the computer 16. The computer 16 can then immediately map to a location on the screen which corresponds uniquely to that value, and which indeed is the position of the input end 20i of the electronic light pen 20.

As the electronic light pen 20 is moved over the surface of the display screen 12, the color region from which light is received can be accurately decoded at a maximum sampling rate of the photo sensitive detectors 23r, 23g, 23b, and which is typically about 1,000 hertz, but which could be up to about 100 kHz. A continuous trail of pixels can be tracked with no pixels being missed, up to a maximum pen speed of about one hundred sixty feet per second, which is greater than a maximum speed typically possible by a human hand. Accordingly, there would be no "dropped" pixels—that is to say, there would be no pixels 14 on the display screen 12 that would go unread by the electronic light pen 20.

Figure 4:
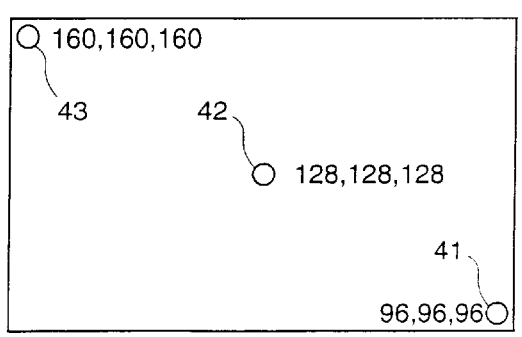
FIG. 4 is a simplified pictorial representation of a portion of a display screen.

It may be undesirable to have a display screen that displays a color gradient with white in one corner and black in another. A less severe color gradient would typically be more desirable. As can be seen in FIG. 4, which shows a display screen or a portion thereof, as discussed hereafter, it is possible for pixel 41 disposed at the bottom right of the display screen 12 to have RGB values of 96, 96, 96, a centrally disposed pixel 42 to have RGB values of 128, 128, 128, and pixel 43 in the upper left corner to have RGB values of 160, 160, 160. These values would represent minimums and maximums of color gradients of the pixels 14 on the display screen 12. Accordingly, the color gradient would appear not overly severe and thus more aesthetically acceptable. Still, it would be possible to create about 32,000 colors in this region, with the region appearing reasonably neutral in color. Further, through use of calibration routine software, the display screen 12 can be illuminated to an RGB level of 255,255,255, in order to determine the total brightness, and to 0,0,0 to determine the "dark" level of the display screen 12; and to determine background levels of ambient light with respect to the range of luminance values of the screen.

Further, it is also possible to quickly change screens, essentially to present a plurality of a few different color screens in quick succession one after the other, in order to produce a visual effect of a reasonably neutral looking display on the display screen 12, or a portion thereof, as discussed hereafter. Still further, it is possible to alter video data, such as the output from a video camera or a computer generated grid having a plurality of active areas which may be such as response generating checkpoints or the like, or combinations of video camera and computer generated screen displays; while, at the same time, alternating such displays with screens having color, grey scale, or luminance gradients, whereby the position of the input end 20i of an electronic light pen may be immediately mapped. Depending on the refresh rates of the video and mapping screens, where the video screen would be considered to be the most important image seen by the eye of the operator, the appearance of the video screen might be such as to have a slight flicker. Nonetheless, specific mapping screens can be interposed without being apparent. This may have certain advantages, particularly when apparatus in keeping with the present invention including an electronic light pen system and an associated display screen is used in surgical procedures whereby the surgeon may map the location of certain critical areas within the surgical site using a video image of that site together with an electronic light pen and associated software. Further discussion of this mode of operation occurs hereafter.

Figure 5A:
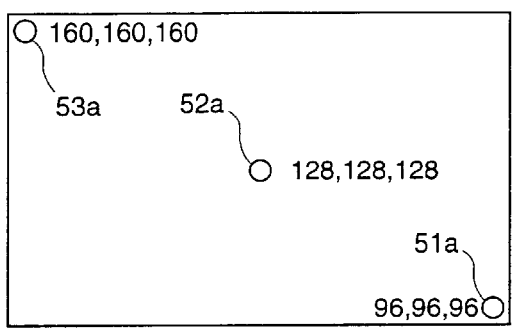
FIGS. 5A through 5D are simplified pictorial representations of a display screen, or a portion of a display screen, showing four different displays on the display screen with each successive display being essentially rotated by 90° clockwise from the previous display.
Figure 5B:
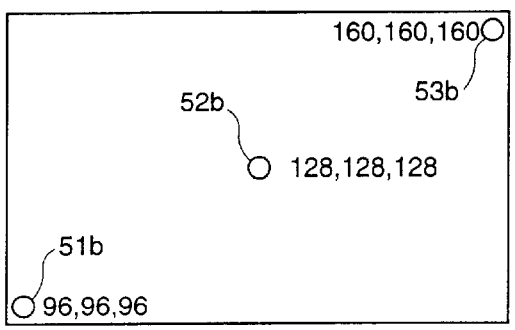
Figure 5C:
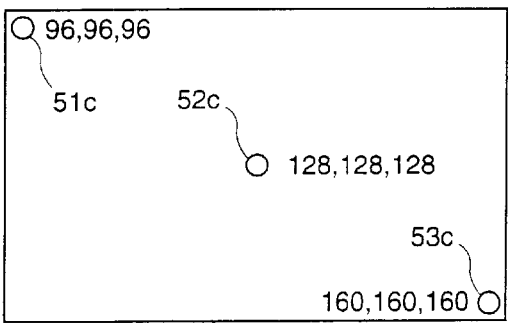
Figure 5D:
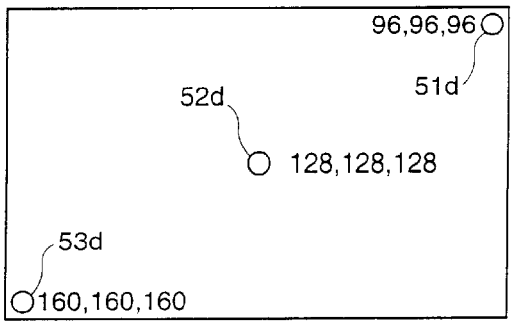
Figure 6:
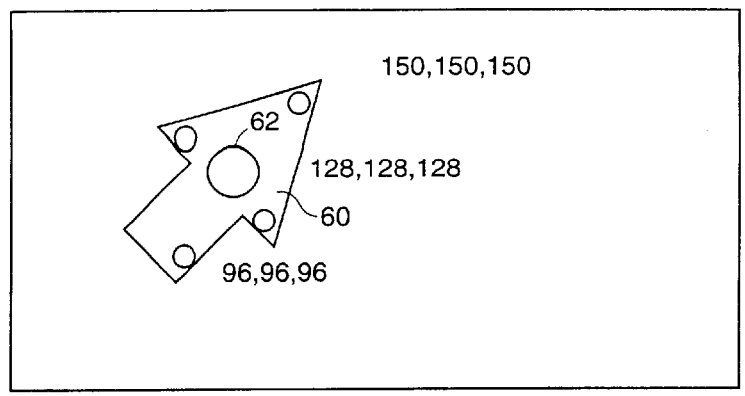
FIG. 6 is a simplified pictorial representation of a display screen showing a typical pointer.

Reference is now made to FIGS. 5A through 5D A first screen in such a series would have pixel 51 having RGB values of 96, 96, 96 disposed at the lower right corner of the display screen 12, centrally disposed pixel 52a having RGB values of 128, 128, 128, and further pixel 53a having RGB values of 160, 160, 160 disposed in the upper left corner of the display screen 12, as can be seen in FIG. 5A. As can be seen in FIG. 5B, the pattern on the display screen 12 has essentially shifted by 90° clockwise as the pixel 51b has shifted to the lower left, the pixel 52b remains in the centre, and the pixel 53b is disposed in the upper right corner of the display screen 12. Next, as can be seen in FIG. 5C, the pixel 51c is disposed in the upper left corner of the display screen 12, the central pixel 52c, remains centrally disposed, and the pixel 53c, is in the lower right corner of the display screen 12. As can next be seen in FIG. 5D, the pixel 51d is located in the top right corner of the display screen 12, the medium pixel 52d is still centrally located, and the pixel 53d is located in the bottom left corner of the display screen 12. Correspondingly, all of the pixels 14 of the display screen 12 could change in RGB value in a similar manner to that as described before pixels 51, 52, and 53. In this manner, each pixel of the display screen would change in RGB value (intensity of the colors red, green, blue) very quickly over time, yet would have a unique value at any given time, and thus be uniquely identifiable while the display on the display screen 12 would appear to a viewer to be essentially a single color. The dynamic changes from one display screen to the next on the display screen 12, as discussed with reference to FIGS. 5A through 5D, would need to take place quickly enough so as to not appear to a viewer to be flickering.

The brightness of pixels 51, 52, and 53 may vary with pixel 51 being dim, pixel 53 being bright, and pixel 52 having medium luminance.

The samples that are taken during each of the phases as shown in FIGS. 5A through 5D are correctly positioned by the software in the computer 16. Presently available computer screens can refresh quickly enough so as to be able to display this above described sequence, essentially as an animation. Accordingly, the background would appear to be a grey sheet of paper, and any foreground objects, such as handwriting, would appear as a constant shade or color, or even as multi-colored, if desired, as programmed in the software.

One significant application for the above discussed technology, namely the electronic light pen system 10 of the present invention, is that of receiving and recording handwriting. The electronic light pen 20 is preferably shaped in the form of a conventional pen for applications where handwriting will be used in order to permit normal "unadapted" handwriting to be performed by a user. By presenting a region on the screen having a pixel format of that disclosed in FIG. 4, or having a dynamic pixel format as disclosed in FIGS. 5A through 5D, handwriting, such as a signature, could be captured in electronic form with a high degree of accuracy and reliability. The electronic light pen 20 would preferably be made to be very directional and substantially impervious to contamination from ambient light, such as by shrouding the end portion 20i, or by metallizing the peripheral exterior of a bundle of fibre optics. When the input end 20i of the electronic light pen 20 is lifted from the screen the light intensity, and therefore the RGB values, will drop to a very low level. When contact is actually made or resumed with the screen, the color of the pixel 14 or pixels 14 at that location will be accurately measured and the location immediately established and recorded by the software. Such detection of the light emanating from the pixels 14 of the display screen 12 can be captured extremely quickly and can be converted to digital data for the computer 16 also extremely quickly and can virtually immediately be displayed on the display screen 12 at the correct location. In other words, any pattern traced by hand on the screen could be mimicked by the pixels 14 on the display screen 12 extremely quickly and accurately. Accordingly, it is possible to perform completely natural handwriting on the display screen 12 due to the very high sampling rate of the electronic light pen system 10, completely independently of the refresh rate of the display screen 12. Such writing using an electronic light pen 20 on the display screen 12 will have the positioning characteristics and "pen feel" and "ink flow" characteristics of conventional writing, including being lifted on and off a piece of paper. It has been shown that an optical "nib" having a diameter of about 1.0 millimeters provides a feel very similar to a conventional ball point stick pen.

Further, the color produced by the electronic light pen 20 can very accurately mimic an ink-based system where the amount of ink deposited along the length of the line is not constant.

A template grid for handwriting recognition could be inserted over the area where the handwriting is to be received, which template grid for handwriting recognition could operate at a duty cycle of perhaps 50%. The color information received from the pixels 14 of the display screen 12 could be sampled during the remaining 50% of the duty cycle. Such templates for handwriting recognition could eliminate the need for keyboards in many applications. The illumination of the photo sensitive detectors 23r, 23g, 23b by more than one pixel will allow for a very accurate recording of movement of the electronic light pen 20, which could appear to be nearly analog on the display screen 12. Magnification, or scaling up, of the area where handwriting occurs, could allow for very fine and precise analysis of such handwriting on the display screen 12 using the electronic light pen 20, and thus also could allow a high degree of accuracy of handwriting recognition. Signature recognition using the electronic light pen 20 could add an additional level of security to a banking machine or credit card transaction. Additional security could be realized by using an electronic light pen 20 that has a memory chip therein. The memory chip could be programmed digitally by encoding color or brightness sequences as files, for recognition by the electronic light pen 20. Such files could be quite sizable given current levels of FLASH™ technology.

Another significant application of the electronic light pen system 10 is that of creating a pointer on the display screen 12, which pointer might be similar in appearance to pointers displayed by WINDOWS™ type operating systems on conventional computers. In use, the electronic light pen 20 would be used for more than merely controlling the pointer 60. When it is desired to control the pointer 60, the pointer 60 must first be "picked up" by the electronic light pen 20, or positioned under the tip of the light pen by a locating algorithm. This is accomplished by pointing the electronic light pen 20 at the pointer 60, or a specified portion thereof. The exact position of the input end 20i of the 20 with respect to the pointer 60 is determined as the pointer has a color gradient shown in FIG. 6. If the electronic light pen 20 moves across a display screen 12 the color presented to the electronic light pen 20 also changes, thus causing the RGB or grey scale values received by the electronic light pen 20 to change. This permits movement of the electronic light pen 20 with respect to the display screen 12 to be realized, and thus ultimately allows for the software in the computer 16 to move the pointer 60 in a corresponding manner.

For example, a region of the screen can be coded so as to appear like a conventional mouse pointer 60—which, of course, can have any desired shape. In order for the electronic light pen 20 to pick up the pointer 60, the color grid for the screen is displayed for one or two scan refreshes— faster than can be noticed by the human eye. The pointer is then located at the tip of the electronic light pen 20. The pointer 60 may have a color gradient such as that shown in FIG. 6, with a central region or pixel 62 having an RGB value of 128, 128, 128, and other regions having RGB values of 150, 150, 150 and 96, 96, 96 as shown. Then, the pixel 62 will remain aligned with the input end 20i of the electronic light pen 20. The apparent speed of movement of the pointer 60 across the display screen 12 will mimic the speed of movement of the electronic light pen 20 across the display screen 12. As the electronic light pen 20 accelerates, the change in position, and therefore the apparent movement, of the pointer 60 will accelerate. Moreover, for fast movements, the pointer 60 can be made larger so as to minimize the chance of "losing" the pointer 60. Also, for fine, slow movements, which would typically be made in a small area, the pointer 60 can be made smaller. The pointer 60 can be dynamically re-sized and repainted with a corresponding color gradient by the software, according to the acceleration or deceleration of the electronic light pen 20.

Band widths of 10,000 samples per second are readily handled by the computer 16. Such sampling rates would allow for measurement of approximately eight full horizontal scans of a 1280 by 1024 display screen each second. Devices may be constructed having a bandwidth of 300 kHz using the electronic components described subsequently.

Figure 7:
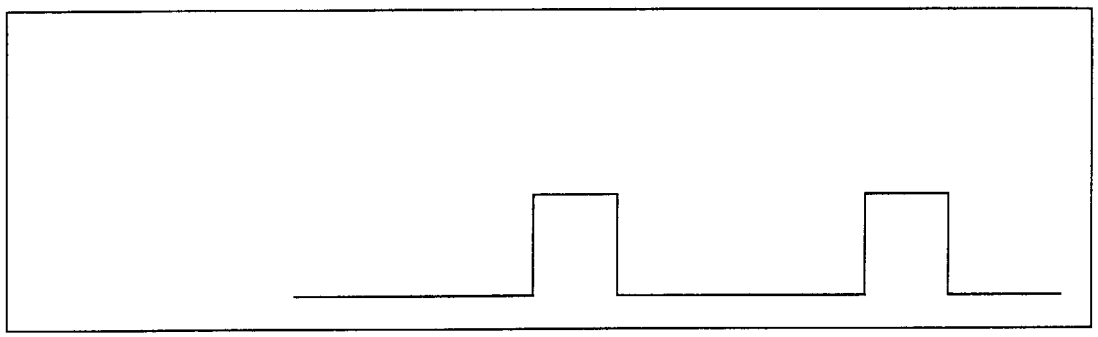
FIG. 7 is a graph showing the analog output level of a device used to generate a "single or double click" for input to a computer.

Modern WINDOWS™ type operating systems virtually universally have a means to provide an enactment signal upon selection of an area of the screen. Typically, when a mouse is used, depression of one or more mechanical buttons on a mouse permits such selection. In the present invention, "mouse clicks" can be mimicked in various manners. A convenient suitable switch may be disposed on the exterior of the electronic light pen 20. Quick double contacts with an appropriate area of the screen could emulate a double click. Also, there may be a pressure sensor built into the device. In any event, an output from the electronic light pen 20 representing a double click is shown in FIG. 7. Here, the curve 70 shows an analog output level of a signal which will be used to emulate mouse clicks. The "at rest" or inactivated output is shown at level 72; when a mouse click occurs such as by depression of mechanical button, the level goes high to level 74, momentarily. A very short time thereafter, a further momentary excursion of the output level to level 74 occurs; the time between the pulses shown in FIG. 7 being sufficiently short as to be recognized by the software which is resident in the computer 16 as being indicative of a "double click". A single click may be similarly created.

Figure 8:
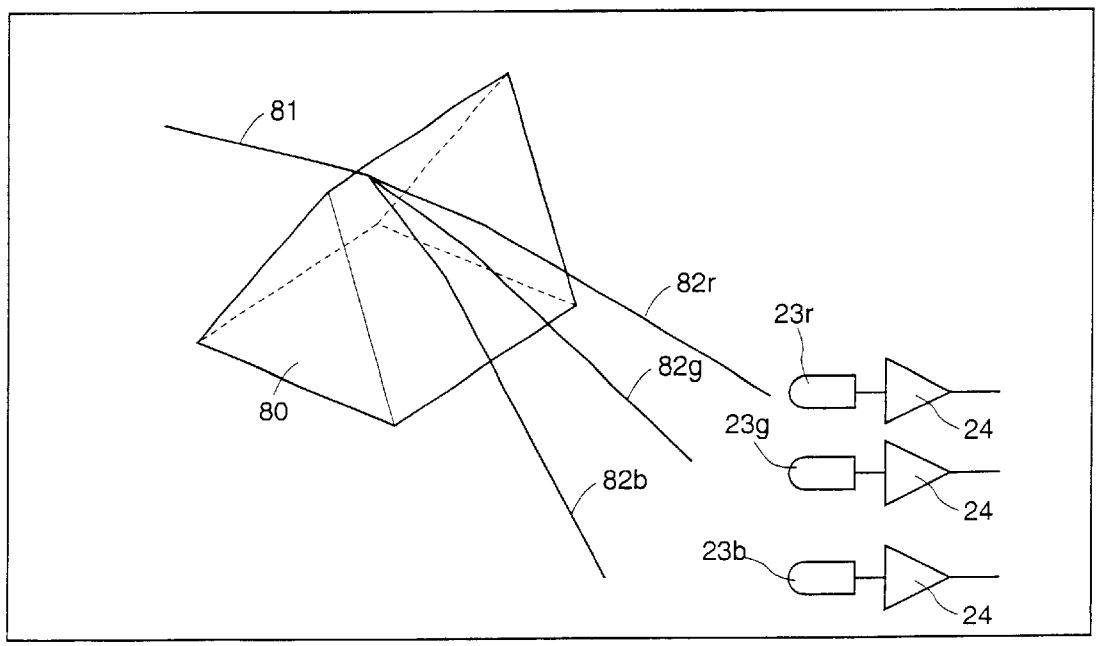
FIG. 8 is a simplified pictorial representation of an embodiment of an electronic pen of the present invention where a prism is used to divide incident light from a fibre optic bundle into three separate colors.

Many conventional video cards for use in the computer 16 provide resolutions of eight bits per color, or in other words over sixteen million colors. In order to correctly detect and identify such a large number of colors, various embodiments of the present invention could be used. The first embodiment is shown in FIG. 8 where a dispersion prism 80 is shown breaking an incident light beam 81 from a fibre optic bundle into its components, including a red component 82r, a green component 82g, and a blue component 82b. The red component 82r is received by the red-sensitive photo detector 23r; the green component 82g is received by the green-sensitive photo detector 23g, and the blue component 82b is received by the blue-sensitive photo detector 23b. A resulting twenty-four bit word is produced by the analog to digital converter.

Figure 9:
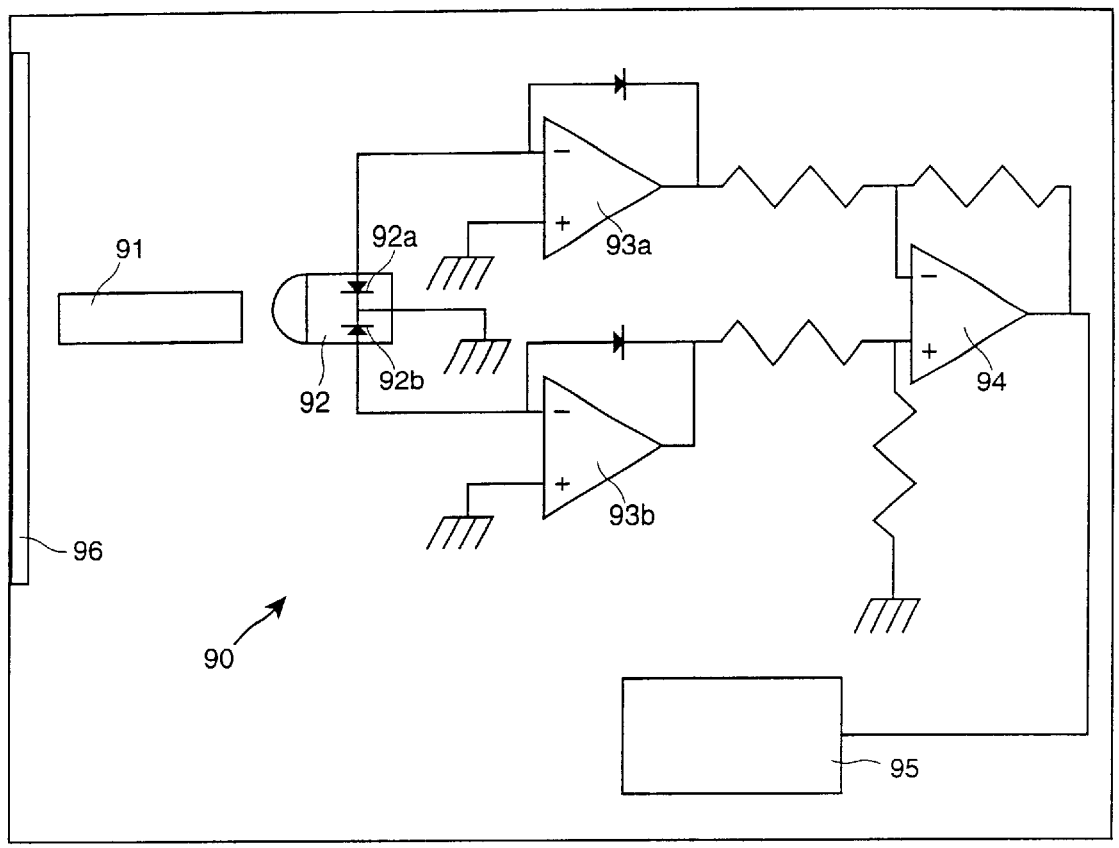
FIG. 9 is a simplified pictorial and schematic representation of another embodiment of an electronic pen of the present invention for recognizing different luminance levels of various colors of light.

Reference will now be made to FIG. 9, which shows a semi-conductor color sensor as indicated by the general reference numeral 90, having a fibre optic color pen tip 91 and a semi-conductor color sensor 92 having two photodiodes 92a and 92b, each of which is sensitive to a specific distinct narrow bandwidth of light at different ends of the visible spectrum. Each of the photodiodes 92a and 92b feeds into its own operational amplifier 93a, 93b, the outputs of which are fed into a comparator 94. The output of the comparator 94 is fed into an analog to digital converter 95. In use, the fibre optic color pen tip 91 receives light from a display screen 96. The ratio of absorption of light of each of the two photodiodes 92a, 92b, provides a measure of the wavelength of the incident light. The ratio log (current 1/current 2) where current 1 is the current from diode 92a and current 2 is the current from diode 92b, is computed by a circuit and is output to the analog to digital converter. Brightness does not affect this semi-conductor color sensor 90, as the ratio of the current increases proportionately in both photodiodes simultaneously. This semi-conductor color sensor 90 is not useful with monochromatic displays.

Figure 10:
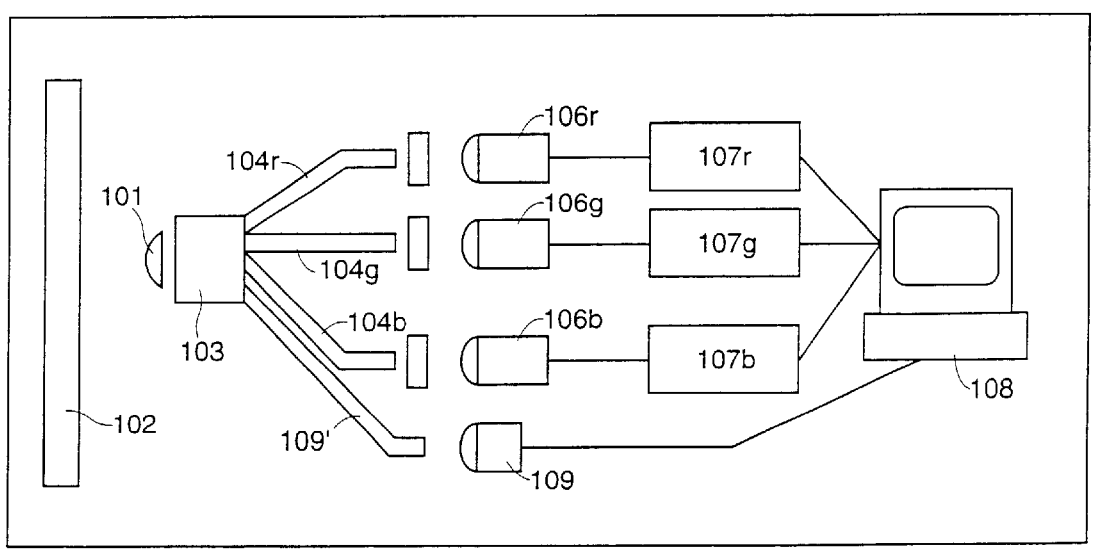
FIG. 10 is a simplified pictorial representation of another embodiment of a color light pen system of the present invention, employing a collimating lens to collect incoming light from a monitor screen.

A typical preferred embodiment of an electronic light pen of the present invention that will sense red, green and blue pixel values is shown in FIG. 10. This device measures red, green and blue pixel values independently through color filtered independent photodiodes having active circuitry to normalize the output current of a red, blue and green wavelength optimized sensor. The measured values provide RGB information to the software. As can be seen in FIG. 10, an electronic light pen 100 comprises a collimating lens 101 that contacts the display screen 102 at a contact region. Light from the contact region is fed through a light pipe 103 where the light is divided into three equal portions at 104a, 104b and 104c, which are multi-stranded fibre optic cables, with each color being received by an approximately equal amount of strands. For instance, Mitsubishi ESKA brand fibres having a diameter of 265 micrometres with 64 strands per bundle could be used. The bundles 104r and 104g could have 21 strands each and the bundle 104b could have 22 strands. The light is then filtered through red filter 105r, green filter 105g and blue filter 105b, so as to isolate each primary color illumination intensity from the display screen 102. Photodiodes 106r, 106g and 106b receive the light from the filters 105r, 105g, 105b respectively. The filters are chosen for excellent color separation (for example, Kodak scientific red #25, green #58, and blue #47 may be used). The amplifiers and the analog to digital converters 107r, 107g, and 107b receive the analog signals from the photodiodes 106r, 106g, 106b, respectively, and their outputs are fed into a computer 108. Calibration circuitry allows for the normalization of the response of the photodiodes 106r, 106g, 106b, to the analog to digital device's input range; and the calibration circuitry also provides for the compensation to adjust for varying screen brightness and varying ambient light. Also noted in FIG. 10 is that the electronic light pen 100 may have a light emitting diode emitter 109 that emits light which is received by a fibre optic bundle 109'. Light from the LED emitter 109 is thereby channelled to the lens 101, where it is emitted toward the display screen 102. In this manner, the communication between the electronic light pen 100 and the display screen 102 can be bi-directional. The color pen could contain identifying information that could be communicated to the display screen 102, if the display screen 102 is appropriately configured for receipt of such information, on a selected basis, such as with each transaction in a restaurant data terminal; or, more particularly, for input from a surgeon or attending physician, as well as from various nurses having specific responsibility in an operating theatre, intensive care unit, obstetrics or paediatrics unit, and so on. Essentially, this provides a form of security access. If the electronic light pen 100 is hung around the neck of a user, for example, and is wireless, then a very convenient and inexpensive system can be implemented. The cost advantage of the electronic light pen system 10 using the electronic light pen 20 over touch screens in applications such as those described immediately above, among others, is at least an order of magnitude where large video displays are employed.

Periodically, during the movement of the electronic light pen 100 across the display screen 102, the display on the display screen 102 can be varied according to a predetermined routine to calibrate the electronic light pen 100. A mechanical assembly is contemplated that will maximize the transmission of light from the display screen 102 to the electronic light pen 100 to adjust for the angle of the lens 101 and light pipe 103 with respect to the display screen 102, so as to accommodate different individuals' writing posture and method. Further, this assembly could support the focusing of the electronic light pen 100 onto a very few pixels to make the localization of color or grey scale information very specific.

Other uses of bi-directional electronic light pens include data communications and bar code scanners.

It is contemplated that multiple pick-ups or lenses could be located in a single electronic light pen device, thus adding the possibility of a rotational determination to the electronic light pen. This could be useful in signature recognition, or could be employed in a "mouse style body", as can be seen in FIG. 11, and thus can be useful in replacing existing tablet style devices for use with CAD software. Angular information and distance information from the two color sensors 111 and 112 of the mouse type electronic light pen or pointer device, as indicated by the general reference numeral 110, are computed to orient the crosshairs 113. The mouse type electronic light pen 110 can be used in conjunction with software-controlled menus to track directly over a drawing surface, such as a large liquid crystal display acting as a drafting table.

It is also contemplated that it is possible to add a sense of touch to the electronic light pen of the present invention. In the prior art, generally neither a mouse nor a touch screen is configured to determine how hard the user is pressing on the receiving surface. As can be seen in FIG. 12A, a pressure transducer 122 can be incorporated into an electronic light pen, shown by the reference numeral 120, in order to provide feedback for using the electronic light pen 120 as a writing or drawing instrument. The electronic light pen 120 is used as a conventional graphite pencil in this application. The location of the electronic light pen 120 is tracked as discussed above with reference to other embodiments of the present invention, and the additional feedback of the pressure transducer provides information regarding the pressure of the drawing tool on the receiving surface. The pressure transducer produces an analog output that is proportional to the pressure of the 120 on a receiving surface, as can be seen in the accompanying graph in FIG. 12B. It is possible to achieve varying line width, as is illustrated in FIG. 12C, or varying color of a line, in one single action of a person's hand. This type of information normally requires two steps with other prior art drawing tools. The analog information is continuously variable, which is unlike quantized information available from conventional line width commands using other conventional drawing tools. Standard left and right mouse buttons could be incorporated to permit immediate compatibility with WINDOWS™ type software.

Reference will now be made to FIGS. 13 and 14, which show focusing mechanisms that permit the capture and measurement of light from only a very few pixels at a time. As can be seen in FIG. 13, an electronic light pen, as indicated by the general reference numeral 130, is used in adjacent or contacting relation with a display screen 131. A variable length focusing mechanism 132 incorporated in the electronic light pen 130 permits adjustment of the focal length of the electronic light pen 130 to allow for varying screen construction technologies to be accommodated and compensated for, and still maintain excellent performance.

As can be seen in FIG. 14, an electronic light pen, as indicated by the general reference numeral 140, is at a distance from a display screen 141, of from small fractions of inches to several feet. A variable length focusing mechanism 142 incorporated in the electronic light pen 140 has a focusing lens 143 that permits adjustment of the focal length of the electronic light pen 140 to accommodate use of the electronic light pen 140 at any selected distance from the screen.

Figure 16:
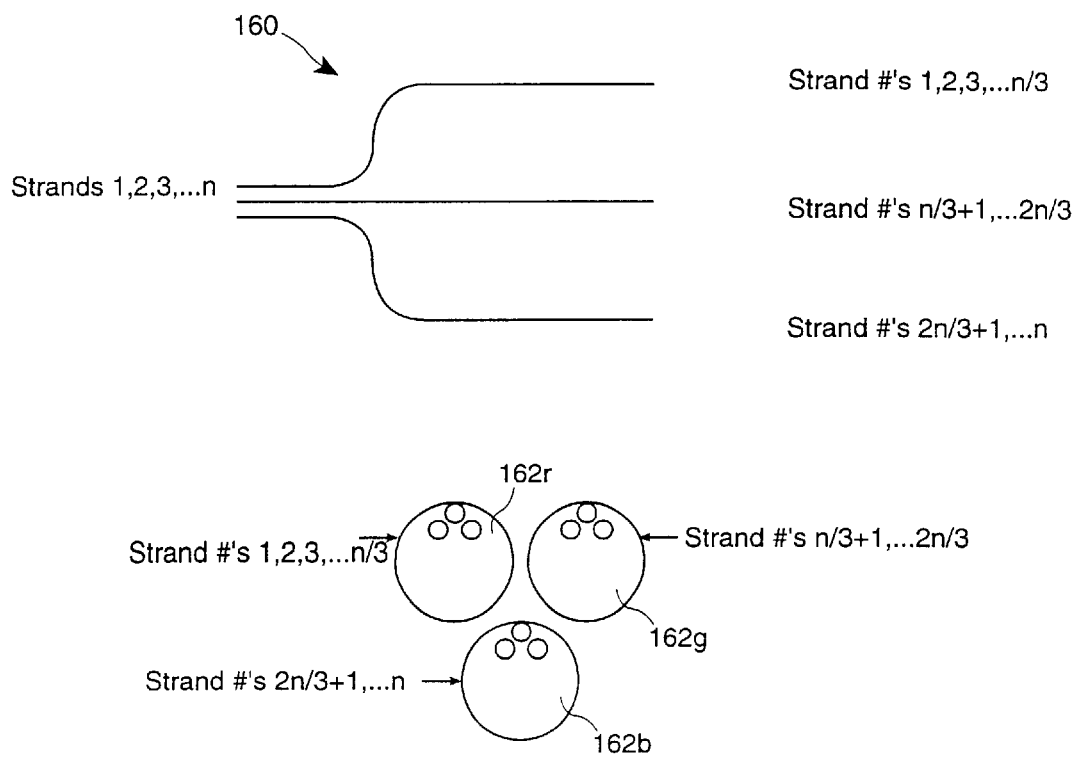
FIG. 16 is a simplified pictorial representation of a second embodiment of a light pipe having an arrangement of fibre optic strands.

Reference will now be made to FIG. 15, which shows a first embodiment of a light pipe assembly, and to FIG. 16, which shows a second embodiment of a light pipe assembly. A plurality of "n" fibre optic strands, as indicated by the general reference numeral 150 in FIG. 15, is distributed evenly to each of the three color detectors 152r, 152g, 152b, with detector 152r receiving strands 1, 4, 7, . . . , (3n−2); detector 152g receiving strands 2, 5, 8, . . . , (3n−1); and detector 152b, receiving strands 3, 6, 9, . . . , (3n). Each of the three groups of strands is evenly distributed over the input end 20i of the electronic light pen 20. If the focal length being used involves more than one pixel of light being transmitted through to the detectors 152r, 152g, 152b, then the light each detector sees will be equally representative of all of the seen pixels. Alternatively, as can be seen in FIG. 16, a plurality of "n" fibre optic strands, as indicated by the general reference numeral 160, is distributed such that the first one-third of the strands (1, 2, 3, . . . , n/3) is received by the detector 162r; the second one-third of the strands (n/3+1, . . . , 2n/3) is received by the detector 162g; and the third one-third of the strands (2n/3+1, . . . , n) are received by the detector 162b. The three groups of strands are separated one from another at the input end 20i of the electronic light pen 20. In this manner, rotation of the electronic light pen 20 may be readily detected.

In any event, the fibre optic strands 150 and 160 as shown in FIGS. 15 and 16, respectively, are held rigidly in place by epoxy or other suitable glue, and the ends of the fibre optic strands along with the glue can be polished into a lens face. The fibre optic strands 150,160 may be made from glass or any other suitable material known in communications technology, or other state of the art optical methods.

Figure 17:
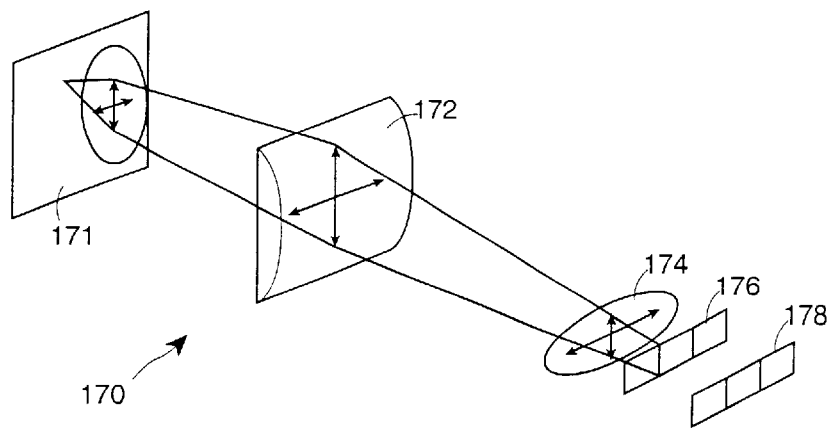
FIG. 17 is a simplified three-dimensional pictorial representation of an optical implementation used in the electronic light pen system of the present invention.

FIG. 17 illustrates an optical implementation of an electronic light pen of the present invention, as indicated by the general reference numeral 170, that receives light from a display screen 171. The electronic light pen 170 comprises a collimating or focusing lens 172, which is followed by cylindrical lenses 174 to equally illuminate a photodiode array 178 through RGB filters 176.

Figure 18:
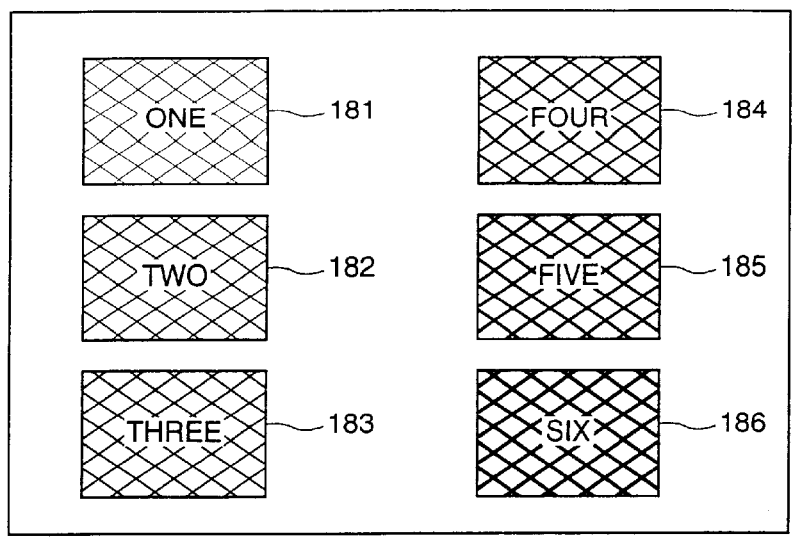
FIG. 18 is a simplified pictorial representation of a portion of a display screen showing "buttons" displayed on the screen.

It is also possible to use the electronic light pen system 10 of the present invention to emulate a conventional screen such as those found on a banking machine, a restaurant data terminal, a phone system, or an internet terminal using a conventional television screen or monochrome LCD. As can be seen in FIG. 18, areas of the display screen 180 can be programmed as "color buttons" 181 through 186. When these "color buttons" 181 and 186 are contacted by the electronic light pen 20, the appropriate action can be determined by the software in the computer 16. The electronic light pen 20 provides an ideal input device for a "set top box" type of computer that would be used with a conventional television screen. An electronic light pen 20 equipped with a telescopic lens can focus on very small areas of a television screen from a great distance, and accordingly could be used to interact with the software driven display on the television screen from the other side of a room.

Figure 19:
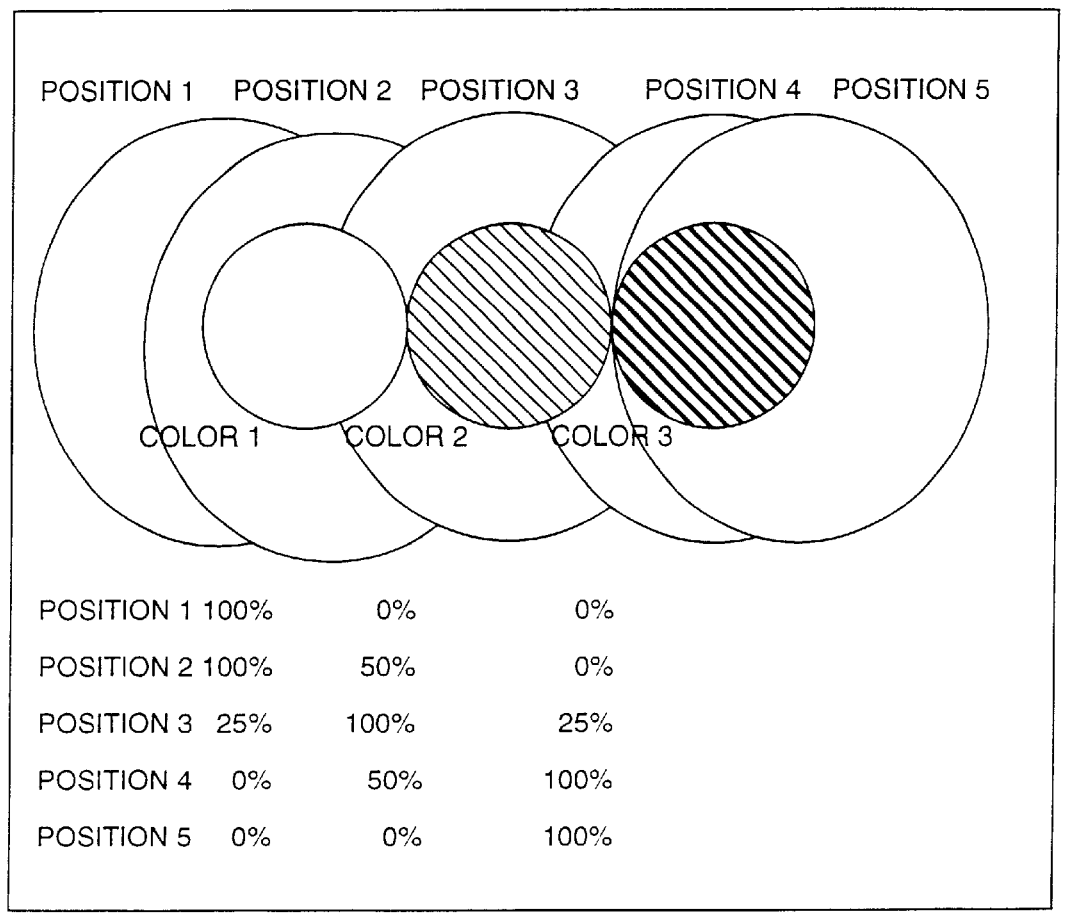
FIG. 19 is a simplified pictorial representation showing five possible positions of the tip of the electronic light pen of the present invention with respect to three color pixels on a display screen.

Reference will now be made to FIG. 19, which illustrates how the electronic light pen system 10 of the present invention can interpolate positions even finer than screen resolution. If the input end 20*i* of the electronic light pen 20 were in position 1, it would receive 100% of color 1, 0% of color 2, and 0% of color 3. If the input end 20*i* of the electronic light pen 20 were in position 2, it would receive 100% of color 1, 50% of color 2, and 0% of color 3. If the input end 20*i* of the electronic light pen 20 were in position 3, it would receive 25% of color 1, 100% of color 2, and 25% of color 3. If the input end 20*i* of the electronic light pen 20 were in position 4, it would receive 0% of color 1, 50% of color 2, and 100% of color 3. If the input end 20*i* of the electronic light pen 20 were in position 5, it would receive 0% of color 1, 0% of color 2, and 100% of color 3. Obviously, there may be an infinite number of positions ranging from position 1 to position 5, each generating a slightly different mix of colors 1, 2, and 3. However, the point is that position sensing is possible which has greater position sensitivity than would otherwise be allowed by the screen resolution.

Reference will now be made to FIG. 20, in which the electronic light pen system 10 of the present invention is illustrated more comprehensively than in some other Figures. Many of the components shown in FIG. 20 are the same as those shown in FIGS. 1 and 2, and also other Figures, and are numbered accordingly. Alternatively, a polished fibre optic bundle 15 terminating in a tip 7 and surrounded by a sheath 5 is used to gather light and to transfer the gathered light through three bundles 104*r*, 104*g*, and 104*b*, to the red filter 106*r*, the green filter 106*g*, and the blue filter 106*b*, respectively. A fourth bundle 109' may be utilized to transmit light emitted by the LED emitter 109 toward the tip 7. The polished fibre optic bundle 15 is angled to provide a comfortable writing orientation for a user. A pressure transducer 9 also surrounds a portion of the polished fibre optic bundle 15. Momentary switches 11*a*, 11*b* are mounted on the exterior of the case 25 and act as selection buttons, much like the buttons on a conventional computer mouse. Additionally, a phototransistor 17 mounted adjacent the display screen 12 permits receipt of data transmitted by the light emitting diode emitter 109. Also, a light emitting diode emitter 108 mounted adjacent the display screen 12 permits transmission of data from the computer 16 to the electronic light pen 20.

One advantage of the electronic light pen system 10 of the present invention is that complex curves may be generated to the level of expertise of an artist or engineer. The electronic light pen 20 of the present invention can be used as a stylus, under the fine motor control of an individual's fingers. Thus, extremely fine movements are brought into play, and may be readily detected by the electronic light pen system 10. In contrast, a conventional mouse involves the more generalized movements of the forearm and wrist, and perhaps small amount of fine motor control of the fingers. Another advantage is that in use of the electronic light pen system 10, a user's eye is fixated on the point where the electronic light pen 20 contacts the display screen 12, as in conventional writing on paper, which allows more natural interaction of the individual with the computer as compared to trying to write with a conventional mouse and computer. Also, in direct contradistinction, writing tablets that are physically separated from the computer monitor force the fixation of the user's eyes to be in a distinct and different location than the user's hand, which is unnatural, clumsy, time consuming, and produces inaccuracies.

Turning now to FIGS. 21 through 24, a brief description of a proposed commercial embodiment of an electronic light pen system in keeping with the present invention follows. In this embodiment, the light pen has a similar appearance to a conventional ball-point pen, for example, and is of approximately the same size but of perhaps slightly greater diameter. The embodiment of electronic pen is shown generally at 210, and comprises a series of working modules. They include an acquisition module 212, a processing module 214, a battery 216, a radio transmitter module 218, and an antenna assembly 220. The electronic pen 210 is housed in a housing 222.

Figure 24:
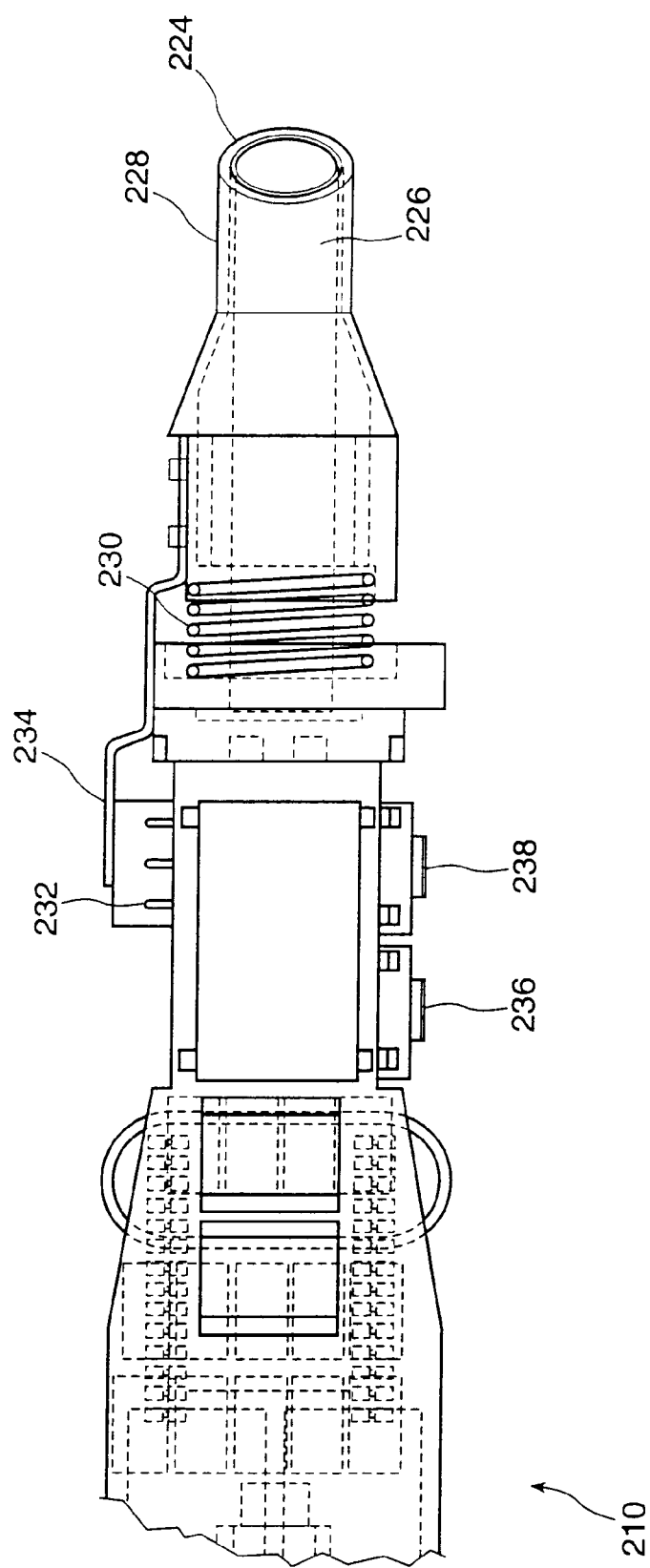
FIG. 24 is a enlarged representation of the front or tip end of the proposed commercial embodiment of an electronic color light pen in keeping with the present invention.

Within the acquisition module 212, as shown more particularly in FIG. 24, there is a tip 224, which is typically arranged at an angle of about 45° up to 60° with respect to the longitudinal axis of the unit. That tip 224 is, in fact, at the end of a light pipe 226, and is arranged within a sleeve 228 which is typically made from PTFE. A spring 230 is arranged within the acquisition module, and it biases the tip 224 outwardly away from the body of the electronic light pen 210. However, a light emitter/detector module 232 is arranged to underlie a sliding shutter assembly 234. The sliding shutter assembly 234 is made of polished stainless steel or other suitable material, and light emitted from the emitter/detector module 32 is reflected from the interior surface of the sliding shutter assembly 234. When the tip 224 is pressed against a display screen 12, the spring 230 will collapse under the pressure exerted against the display screen 12 by the electronic pen 210 which is held in a region further away from the tip 224 than the sliding shutter 234. Thus, the sliding shutter 234 retracts, and the amount of light reflected from its interior surface back to the emitter/detector module 232 increases. This permits a calibration pulse in the first instance to be generated, which instructs the computer 16 that the electronic light pen 210 is about to begin doing its work. Moreover, once a calibration pulse has been generated, the interaction between the sliding shutter 234 and the emitter/detector module 232, in co-operation with the spring 230, may also function in the same manner as a pressure transducer such as that described with respect to FIGS. 12A, 12B, and 12C, above.

A pair of actuating buttons 236 and 238 is provided, which buttons essentially emulate the typical left and right buttons found on a typical computer mouse. The remaining construction is essentially as described above, with RGB filters, photodiodes, amplifiers, and an analog-to-digital convertor, such as described with respect to FIGS. 2, 10, and 20.

A particular manner in which a structure such as that shown in FIGS. 21 through 24 may be utilized, together with a very large LCD flat panel display, is as follows: A neurosurgeon may expose a portion of the brain, and will overlay a grid on the brain. A video camera will then be arranged to photograph the surgical site having the grid overlay located on that exposed portion of the brain. Then, using electrodes and other means, the exposed portion of the brain may be mapped with respect to the grid so as to determine which areas of that exposed portion may control, for example, motor functions with respect to the hands and/or feet of the patient, hearing or visual responses, and so on. Each mapped region may then be indicated by the surgeon or an assistant on the video display by touching the light pen 210 to the video display—which shows the surgical site with the grid overlay thereon—so as to map that portion of the brain. Each time the electronic light pen touches the video display, its position is accurately mapped. This may be accomplished by alternatively displaying the video image while occasionally displaying a color screen having known RGB, grey scale, or luminescence values at each pixel thereof. Thus, even though the surgical team may not even notice the mapping screens, the position of the color pen will be accurately mapped and, therefore, the surgical site will be accurately mapped. Moreover, the mapping may be annotated, such as with handwritten notes; further, a selected area of the screen may be software controlled so as to provide enactment signals by which the computer would be instructed to undertake certain designated tasks. Not the least of those tasks could be the operation of screen capture software, so as to obtain a bit-mapped or other electronic version of the annotated and mapped video screen display.

Figure 25:
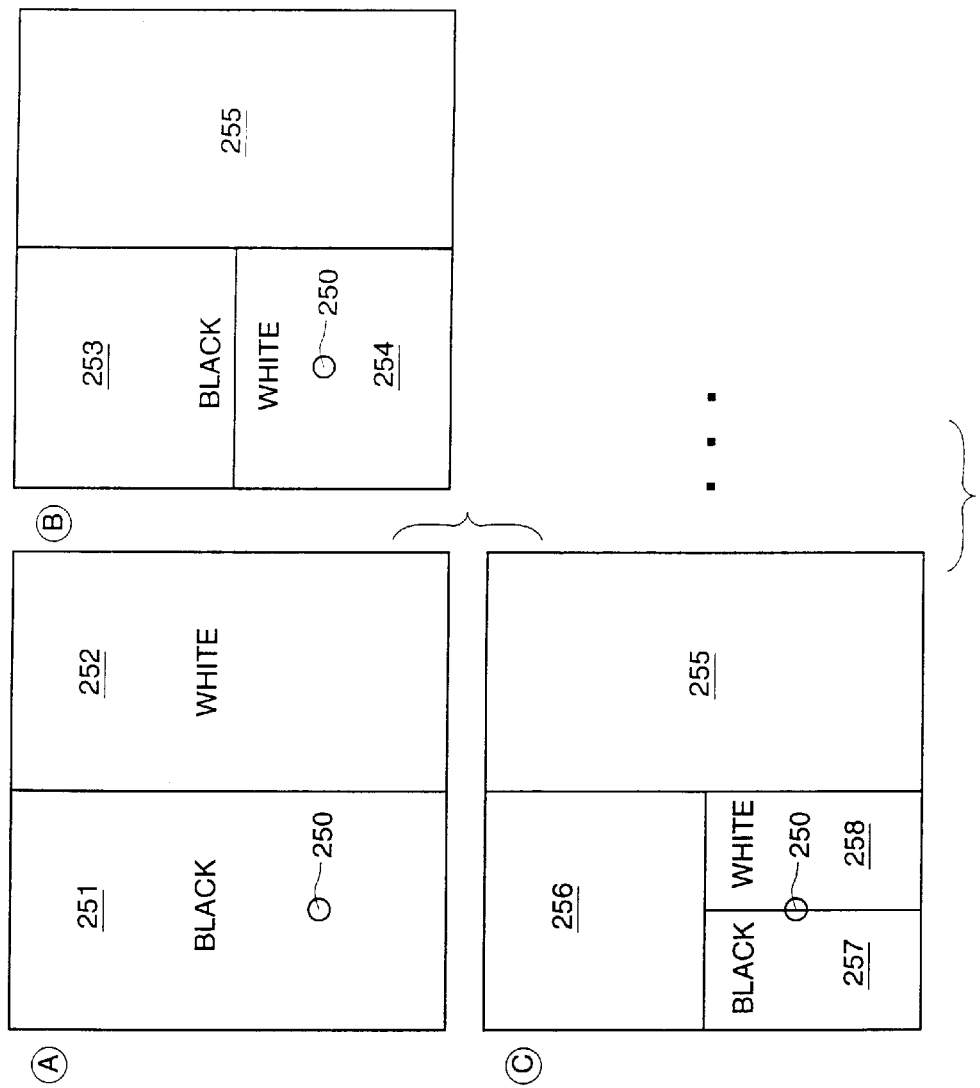
FIG. 25 is a diagrammatic representation of the operation of electronic mapping software in keeping with the present invention, working in a binary mode.
Figure 26:
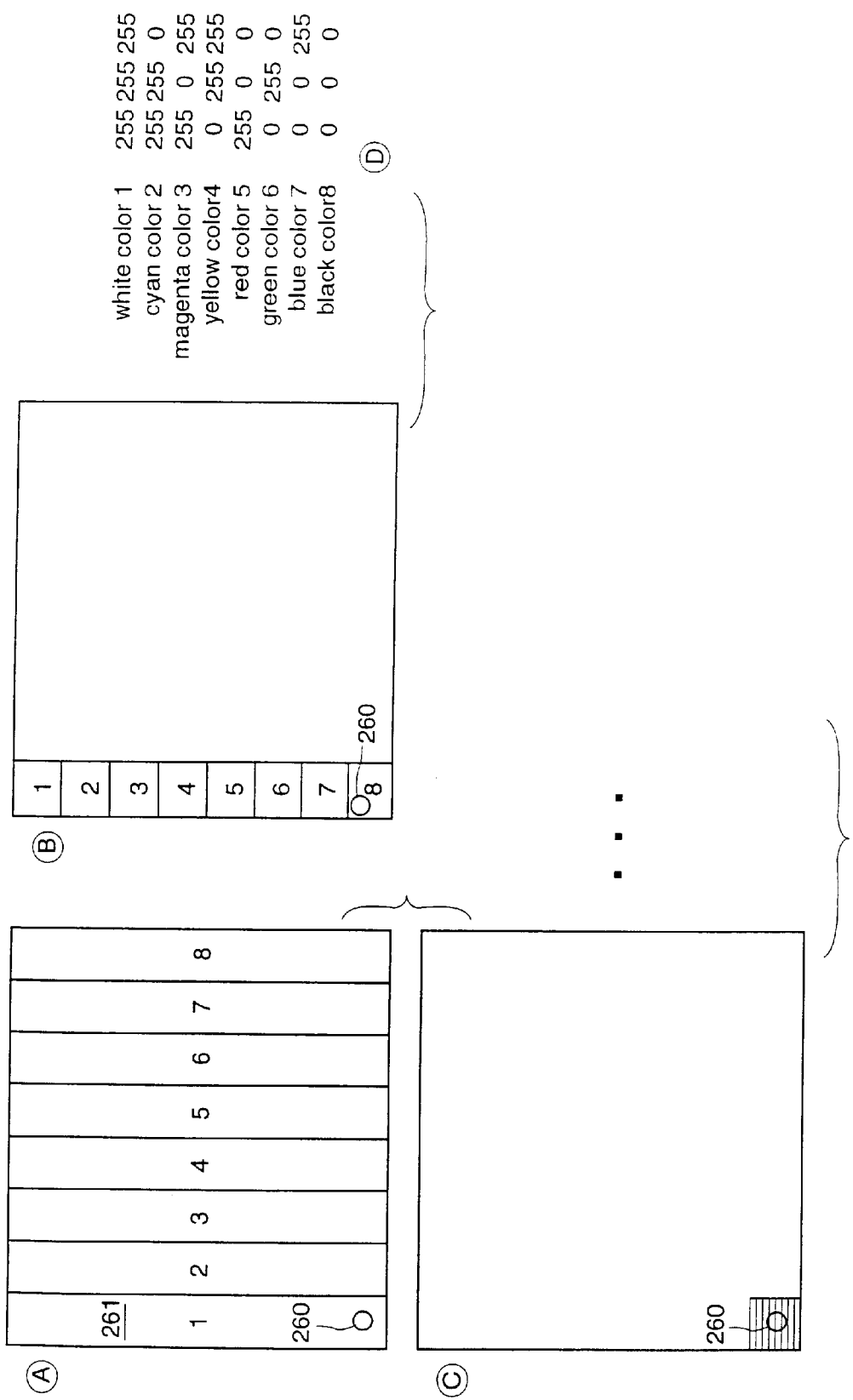
FIG. 26 is a diagrammatic representation of mapping software in keeping with the present invention, working in 3-color, 8-bit mode.

Finally, reference is made to FIGS. 25 and 26, which demonstrate another form of mapping technology using repetitive iterations to locate the position on a video display screen against which the tip of an electronic light pen in keeping with the present invention has been placed. It will be kept in mind that, in the usual case, the video display screen is showing a meaningful video display, such as the video display of a mapped region of a surgical site as described above. Each time the light pen touches the video display, it is necessary to map the specific area or point on the video display where the light pen is located. For that reason, as noted above, the video image may be replaced with an occasionally displayed color screen having a known RGB, grey scale, or luminance value at each pixel thereof. However, other mapping technology exists in keeping with the present invention where it is not necessary to have a specific known RGB, grey scale, or luminance value for each pixel or group of pixels on the video display screen. Instead, two typical mapping software operating systems which function particularly well with electronic light pens in keeping with the present invention, require a series of iterations and exchanges of information between the electronic light pen and the mapping software which is resident in the computer to accurately locate the position at which the tip of the electronic light pen has been placed. It should be stressed that the rate at which the sampling iterations takes place is independent of the refresh rate of the screen. Accordingly, it may be necessary only to interpose the mapping screen a few times; and, as will be noted hereafter, each iteration of imposing the mapping screen is done on a significantly smaller portion of the screen each time, so that the remaining screen may revert to the application screen such as the video display of a surgical site being examined.

In broad terms, the method of locating the position on a video display screen being touched by an electronic light pen is predicated on the electronic light pen having light gathering optical means for receiving light emanating from the video display screen, and including at least one photo sensitive detector against which the light from the video screen is directed. As discussed above, the electronic light pen also comprises circuit means for receiving signals from the at least one photo sensitive detector, for processing those signals, and for transmitting data signals whose value is determined by the light from the video display screen by the at least one photo sensitive detector at any instant in time. Those data signals are transmitted to a computer which receives them, and provides information as to their value. At any instant in time, the computer and the video display screen are linked together, and the computer includes driver means for writing specific color and/or luminance values to any designated portion of the video display screen.

Also, at any instant in time, when the electronic light pen is at its position adjacent any pixel or group of pixels on the video display screen, a data signal providing information as to the light being received from the pixel or group of pixels is transmitted to mapping software which is resident in the computer. The method for locating the position on the video display screen which is being touched by the electronic light pen therefore comprises the following steps:

(a) Momentarily dividing the video display screen into n equal portions and displaying n mutually exclusive colors or luminance values, one in each of the n equal portions for at least one screen refresh of the video display screen.

(b) During the display of n mutually exclusive colors or luminance values, determining the value of the data signal from the electronic light pen, and matching that value to the driver values for the n equal portions on the video display screen so as to determine in which of the n equal portions the position being touched the electronic light pen is located.

(c) Dividing the matched portion in which the position is being touched by the electronic light pen into n equal portions, for at least one screen refresh of the video display screen, and permitting the remaining n−1 original equal portions to revert to any previous or current video image intended to be displayed therein.

(d) During the display of n mutually exclusive colors or luminance values on the matched portion of the video screen display, once again determining the value of the data signal from the electronic light pen and matching that value to the driver values for the n equal portions of the matched portion of the video screen which are now displayed. This determines in which of the n equal portions of the matching portion the position being touched by the electronic light pen continues to be located.

(e) Each of steps (c) and (d) is repeated until no further division of the continually smaller matched portion is possible.

(f) Finally, from the above, the mapping software will determine the exact location of the position on the video screen as a consequence of the value of the data signal from the electronic light pen as it was at the last iteration of step (e).

If there is at least one photo sensitive detector which is capable of distinguishing between two mutually exclusive colors or two mutually exclusive luminance values, then the value of n is 2. However, if there is at least a monochromatic photo sensitive detector which is capable of distinguishing among eight mutually distinctive luminance values, then n is equal to 8. Typical luminance values, in that instance, are discussed hereafter.

Likewise, where there are at least three photo sensitive detectors, and each is chosen so that the three photo sensitive detectors are three of red, green, blue, and invisible light photo sensitive detectors, and each has a respective red, green, blue, or invisible light color filter associated therewith, then n mutually exclusive colors may be displayed on n equal portions of the video display screen, or on n equal portions of a matched portion thereof, at any instant in time, in keeping with the following table:

|  | FIRST DETECTOR | SECOND DETECTOR | THIRD DETECTOR |
|---|---|---|---|
| COLOR 1 | 255 | 255 | 255 |
| COLOR 2 | 255 | 255 | 0 |
| COLOR 3 | 255 | 0 | 255 |
| COLOR 4 | 0 | 255 | 255 |
| COLOR 5 | 255 | 0 | 0 |
| COLOR 6 | 0 | 255 | 0 |
| COLOR 7 | 0 | 0 | 255 |
| COLOR 8 | 0 | 0 | 0 |

In the above, on a table of 0 to 255, 0 is equally fully off and 255 is equal to fully on, for the driver values for each of the chosen colors on the video display screen being detected by the three photo sensitive detectors, respectively.

Finally, the three photo sensitive detectors may be red, green, and blue, respectively, with respective red, green, and blue color filters associated therewith, in which case a specific table of color values for the colors white, cyan, magenta, yellow, red, green, blue, and black, is given below.

In the first example, the sampling software operates in binary mode, whereby in a sampling sequence for generally a single refresh of the video screen—which typically may be 1/60 up to 1/72 of a second—one-half of the screen is painted black and the other half of the screen is painted white. Of course, other colors, or even mutually exclusive luminance values of a single color may also be chosen. However, for the present discussion, it will be assumed that a more conventional binary—i.e.: black/white system 196 will be employed.

Referring now to FIG. 25, it will be considered that the tip of the electronic light pen is touching the video screen at position 250. Then, for example when some pressure is placed against the electronic light pen so as to depress the spring 230, or a pressure transducer 122, a signal is given to the mapping software to paint the left half of the video screen black as shown as 251 in FIG. 25A, and the right half of the screen is painted white as shown in 252. The electronic light pen, when in position 250, will sense that it is in a black portion of the screen—that is, it is in the left half of the screen—and a data signal will be sent to the computer accordingly. Immediately, the mapping software in the computer therefore knows that the electronic light pen is placed over the left half of the screen, and it will permit the right half of the screen to return to its video display the next time there is a screen refresh. In the meantime, since the sampling rate of the electronic light pen may be in the range of 1,000 Hz or higher, only a single screen refresh may be necessary to at least restore the right half of the screen to the video image otherwise being displayed. Then, on the next iteration, the top of the left half of the screen will again be painted black as shown at 253, with the other half of the left half of the screen being painted white as shown at 254. The region of the screen at 255, as noted previously, then reverts to the video image.

Then, in the next screen refresh, since it was noted in FIG. 25B that point 250 is in the white region 254, and because the electronic light pen would have returned a data signal to the computer that it was in the white region 254, the black region 253 can be recovered by the video image as shown at 256 in FIG. 25C. Now, the light pen location 250 is located in white region 258, and the black region 257 can also be recovered for the application video image as soon as a data signal is received by the computer advising that point 250 is in the white region 258. It will be seen that continuing iterations will be made, until such time as the point 250 may be located with great accuracy.

On a screen operating in black and white mapping areas, in keeping with this example, and having 1,024 by 768 pixels—being a quite high resolution video display, since a typical computer video display is very often 800 by 600 pixels, or even 640 by 480 pixels—there may be up to 15 iterations taken to accurately locate the point 250 in the binary system being described. With a screen refresh rate of 60 Hz, and given time constants for settling, both with respect to the photosensitive detectors in the electronic light pen and the phosphor or liquid crystal display crystals, this might mean that it could take up to one-third of a second to accurately locate point 250. Nonetheless, that is extremely fast and, at worst, the eye of the user will have discerned some flicker and some aberrations to the video image being displayed as it is recovered by continuingly smaller portions, as described above.

FIG. 26 describes a further mapping software and interaction with mapping screens which are mapped with eight colors in each iteration. As shown in FIG. 26A, the electronic light pen may be touching the video display at point 260. The video display screen will, for one screen refresh, be divided into eight color bars 1 through 8 as shown in FIG. 26A. As seen from the chart in FIG. 26D, and assuming a standard 8-bit color intensity, and assuming further that the color intensity will be fully on or fully off for each of the three color guns or three color liquid crystals, light emitting diodes, or lamps, etc., as described above, the colors 1 through 8 will be white, cyan, magenta, yellow, red, green, blue, and black. In this case, the point 260 is found in color region 1—that is, in the white color bar.

Immediately when the computer receives a data signal advising that the point 260 is in the white color region, the remaining 7/8ths of the video display will be permitted to revert to the video image on the next screen refresh. Then, as shown in FIG. 26B, the eight colors will be shown down in the region 261 as eight new color regions, each 1/8th the size of the previous color regions.

Here, the data signal from the electronic color pen to the computer will indicate to the computer that the electronic color pen is in the black color region. The remaining seven color regions will then be recovered for display of the video image on the next screen refresh. By comparison with FIG. 25, it will be seen that on the third iteration shown in FIG. 25C, 75% of the video image has been recovered; whereas, having regard to FIG. 26C, 63/64ths of the video image will have been recovered on the third iteration, or 98.4375% of the video image will again be viewable with only 1.5625% of the video image still being captured by the mapping software for further sampling iterations.

Moreover, the number of iterations may essentially be halved, so that determination of the exact position of point 260 and recovery of the full video image may be accomplished in as little as 0.125 of a second and up to less than 0.2 of a second.

Still further, it should be noted that a single monochromatic photo sensitive detector may be used in the electronic light pen; and, in that case, having regard to the above discussion with regard to FIG. 26, the eight mutually exclusive color regions may be replaced with eight mutually distinctive luminance values of a single color or a determined color mixed from the red, green, and blue phosphors or liquid crystals, as is well known, otherwise the discussion of FIG. 26 is applicable to the case of eight mutually distinctive luminance values. There is further discussion of monochromatic luminance values, below.

Yet another feature of the present invention may be that the light gathering optical means, such as that shown as 21, 22, 23, 101, 103, 105, 106, 107, and as described with respect to 224, 226, having regard to FIGS. 1, 2, 10, 20, and 24, is that one of the photosensitive detectors may be capable of detecting invisible light. For example, any of the photosensitive detectors utilized in the present invention, or an additional photosensitive detector, may be arranged to be sensitive only to infrared light or ultraviolet light. Accordingly, with the appropriate phosphors or liquid crystals, etc., and the appropriate drivers, and particularly if an additional color element is included in a standard red/green/blue color array to provide a further infrared or ultraviolet display, that additional color may be used instead of or as well as either black and white, luminance value, or full color determination of a location point on a video display screen, with less evident video image flicker. Moreover, one photosensitive detector or, in the case where there is only one photosensitive detector, may be made monochromatic so as to be able to detect luminance values within the chosen chromatic band.

For example, it is well known that the eye is less sensitive to changes in blue than to changes in either red or green. Accordingly, the mapping software could be arranged to operate in a binary mode in blue—or even in ultraviolet—showing, instead of black and white, light blue and dark blue. Alternatively, the mapping software could be arranged to show eight different intensities of blue in keeping with grey scale driver technology. Thus, intensities of 31, 63, 95, 127, 159, 191, 223, and 255 may be shown. As noted, the eye may discern some difference; but more importantly, the eye may not discern significant flicker, such as it might if a binary black and white mapping algorithm as described above is used.

Still further, mapping algorithms can be arranged which may use one of red, green, and blue together with infrared or ultraviolet, again resulting in less discernible flicker during a mapping operation. Any such electronic light pen in keeping with the present invention may be manufactured using a light pipe having bundled fibre optic strands, as discussed above. The number of bundles will, of course, equate to the number of photosensitive detectors that are employed.

In yet another embodiment of the electronic light pen system of the present invention, it is contemplated that CCD devices could be used for color separation and recognition. Such CCD devices would typically be more expensive than other devices discussed herein that are used for color separation and recognition, but presumably could be manufactured relatively inexpensively in large quantities.

It should also be understood that the electronic light pen of the present invention does not need to be shaped similarly to a conventional pen, and could be shaped in virtually any form, and could even be shaped similarly to a credit card so as to be able to interact with automated teller machines, debit card point of purchase machines, and the like. It should also be understood that the electronic light pen of the present invention can be configured to read digitally encrypted data from a display screen. For example, such digital encryption could include the color red indicating a binary 0 and the color green indicating a binary 1, with the two colors being flashed on and off in sequence. Also, bar code values could be calculated, the bar code could be displayed on a display screen, and the displayed bar code could be scanned by the electronic light pen. Still further, a gradient of colors, or a graduated grey scale, could communicate eight bit or even thirty-six bit "words", up to the resolution of the display and the light pen.

It can be seen from the above description, that the electronic light pen system 10 of the present invention, can work using any display device that displays color, or grey scale.

Other modifications and alterations may be used in the design and manufacture of the apparatus of the present invention without departing from the spirit and scope of the accompanying claims.

Throughout this specification and the claims which follow, unless the context requires otherwise, the word "comprise", and variations such as "comprises" or "comprising", will be understood to imply the inclusion of a stated integer or step or group of integers or steps but not to the exclusion of any other integer or step or group of integers or steps.

What is claimed is:

1. An electronic light pen assembly for use in conjunction with a video display having a plurality of pixels thereon, said assembly comprising:

light gathering optical means for receiving light emanating from a video display screen, including at least one photo sensitive detector against which said light from said video display screen is directed;

circuit means for receiving signals from said at least one photo sensitive detector, for processing said signals, and for transmitting data signals whose value is determined by the light received from said video display screen by said at least one photo sensitive detector at any instant in time;

computer means for receiving said data signals and providing information as to the value thereof;

wherein, at any instant in time, said video display screen and said computer means are linked together; and wherein, at any instant in time, when said electronic light pen is directed at any pixel or group of pixels on said video display screen, a data signal providing information as to the light received from said pixel or group of pixels is transmitted to mapping software resident in said computer;

whereby, upon successive iterations of a sampling sequence under the control of said mapping software, the position of said pixel or group of pixels on said video display screen can be determined and mapped.

2. The electronic light pen assembly of claim 1, wherein said light gathering optical means includes a lens and at least one photo sensitive detector chosen from the group consisting of visible light photo sensitive detectors and invisible light photo sensitive detectors.

3. The electronic light pen assembly of claim 2, wherein said photo sensitive detector is monochromatic, so as to be able to detect luminance values within the chosen chromatic band.

4. The electronic light pen assembly of claim 1, wherein said light gathering optical means includes a lens and at least two photo sensitive detectors chosen from the group consisting of red photo sensitive detectors, green photo sensitive detectors, blue photo sensitive detectors, and invisible light photo sensitive detectors; and wherein each photo sensitive detector has a respective red, green, blue, or invisible light color filter associated therewith.

5. The electronic light pen assembly of claim 2, wherein said electronic light pen contacts said video display screen, and said light gathering optical means further includes a light pipe which comprises a plurality of optical fibres arranged in at least one bundle thereof so as to deliver a portion of the light received from said video display screen to said at least one photo sensitive detector, respectively.

6. The electronic light pen assembly of claim 4, wherein said electronic light pen contacts said video display screen, and said light gathering optical means further includes a light pipe which comprises a plurality of optical fibres arranged in at least two bundles thereof so as to deliver a portion of the light received from said video display screen to said at least two photo sensitive detectors, respectively.

7. The electronic light pen assembly of claim 2, wherein said computer includes software resident therein to write a distinctive signal to other area of the video display screen where said electronic light pen is located at any instant in time, and to retain prior signals in time sequence, whereby a trace of the locus followed by said electronic light pen as it traverses said video display screen can be displayed thereon, in real time.

8. The electronic light pen assembly of claim 1, wherein said video display screen is chosen from the group consisting of cathode ray tubes, liquid crystal displays, projection type displays, conventional television tubes, plasma displays, electroluminescent displays, light emitting diode driven displays, and multi-color lamp driven displays.

9. The electronic light pen assembly of claim 4, where there are at least red, green, and blue photosensitive detectors and respective associated color filters, and wherein the output from each photo sensitive detector is analog, and each respective analog signal is subsequently fed to an analog-to-digital convertor so as to provide digital values of said data signals whose value is determined by the light received from said video display screen by said red, green, and blue photo sensitive detectors at any instant in time.

10. The electronic light pen assembly of claim 2, wherein a cursor pointer on said video display screen may be generated by resident software in said computer, and wherein at least a specified portion of said cursor pointer has a predetermined optical value;

whereby when said cursor pointer is displayed and said electronic light pen is placed over at least said specified portion thereof, and when said screen is temporarily re-written, a locating algorithm of said software will associate said cursor pointer with said electronic light pen, so that if said light pen is moved, said cursor pointer will follow said electronic light pen.

11. The electronic light pen of claim 4, wherein a cursor pointer on said video display screen may be generated by resident software in said computer, and wherein a specified gradient of optical values is assigned to said cursor pointer;

whereby, when said cursor pointer is displayed and said electronic light pen is placed thereover, and when said screen is temporarily re-written, a locating algorithm of said software will associate said cursor pointer with said electronic light pen; and wherein, when said light pen is moved so as to be associated with another optical value of said gradient of optical values, said software will cause said cursor to move in such a manner as to mimic the speed at which said electronic light pen is being moved.

12. The electronic light pen assembly of claim 4, wherein said lens is a collimating lens.

13. The electronic light pen assembly of claim 12, wherein said electronic light pen further includes a light emitting diode emitter whose output is directed to said collimating lens, and subsequently towards said video display screen;

wherein said video display screen includes photo receptor means to receive and decode light signals emanating from said electronic light pen; and wherein said electronic light pen includes signal generating means to cause specific digital data signals to be transmitted therefrom by means of said light emitting diode emitter.

14. The electronic light pen assembly of claim 4, wherein a prism is interposed between said lens and said red, green, blue, and invisible light photo sensitive detectors, instead of said red, green, blue, and invisible light color filters.

15. The electronic light pen assembly of claim 1, wherein said electronic light pen further includes pressure sensitive means to provide various output signals within a predetermined range of values, the value of which output signals varies with the pressure exerted by said electronic light pen against said video display screen.

16. The electronic light pen assembly of claim 1, wherein said electronic light pen further includes a wireless radio transmitter for transmitting data signals to said computer.

17. The electronic light pen assembly of claim 1, wherein said electronic light pen further includes a variable length focusing mechanism, whereby the area on said video display screen from which the optical values thereof may be determined may be changed in size and focus by adjustment of said variable length focusing mechanism.

18. An electronic light pen assembly for use in conjunction with a video display having a plurality of pixels thereon, said assembly comprising:

light gathering optical means for receiving light emanating from a video display screen, including at least one photo sensitive detector against which said light from said video display screen is directed;

circuit means for receiving signals from said at least one photo sensitive detector for processing said signals, and for transmitting data signals whose value is determined by the light received from said video display screen by said at least one photo sensitive detector at any instant in time; and computer means for receiving said data signals and providing information as to the value thereof;

wherein, at any instant in time, said video display screen and said computer means are linked together, and at any instant in time the optical value of each pixel on said video display screen is unique and is known to mapping software resident in said computer;

whereby, when said electronic light pen is placed adjacent any pixel or group of pixels on said video display screen, said mapping software can determine the position of said electronic light pen by processing the data signals received from said electronic light pen at that instant in time, the value of said data signals having been determined by the light being received from said video display screen by said at least one photo sensitive detector at that instant in time.

19. The electronic light pen assembly of claim 18, wherein each pixel value of said plurality of pixels on said video display screen at any instant in time has a unique grey scale value.

20. The electronic light pen assembly of claim 18, wherein each pixel value of said plurality of pixels on said video display screen at any instant in time has a unique luminance value.

21. The electronic light pen assembly of claim 18, wherein said electronic light pen contacts said video display screen, and said light gathering optical means includes a lens, red, green, and blue color filters, and red, green, and blue photo sensitive detectors associated with said red, green, and blue filters, respectively; and wherein each pixel value of each pixel on said video display screen has a unique value based on the red, green, and blue components thereof.

22. The electronic light pen assembly of claim 21, wherein said electronic light pen contacts said video display screen, and said light gathering optical means further includes a light pipe which comprises a plurality of optical fibres arranged in three bundles so as to deliver a portion of the light received from said video display screen to each of said red, green, and blue color filters.

23. The electronic light pen assembly of claim 21, wherein said computer includes software resident therein to write a distinctive signal to the area of the video display screen where said electronic light pen is located at any instant in time, and to retain prior signals in time sequence, whereby a trace of the locus follows by said electronic light pen as it traverses said video display screen can be displayed thereon, in real time.

24. The electronic light pen assembly of claim 18, wherein said video display screen is chosen from the group consisting of cathode ray tubes, liquid crystal displays, projection type displays, conventional television tubes, plasma displays, electroluminescent displays, light emitting diode driven displays, and multi-color lamp driven displays.

25. The electronic light pen assembly of claim 21, wherein the output from each photo sensitive detector is analog, and each respective analog signal is subsequently fed to an analog-to-digital convertor so as to provide digital values of said data signals whose value is determined by the light received from said video display screen by said red, green, and blue photo sensitive detectors at any instant in time.

26. The electronic light pen assembly of claim 21, wherein a cursor pointer on said video display screen may be generated by resident software in said computer, and wherein at least a specified portion of said cursor pointer has a predetermined optical value;

whereby when said cursor pointer is displayed and said electronic light pen is placed over at least said specified portion thereof, and when said screen is temporarily re-written so as to display unique optical values for each pixel thereon, a locating algorithm of said software will associate said cursor pointer with said electronic light pen, so that if said light pen is moved, said cursor pointer will follow said electronic light pen.

27. The electronic light pen of claim 21, wherein a cursor pointer on said video display screen may be generated by resident software in said computer, and wherein a specified gradient of optical values is assigned to said cursor pointer;

whereby, when said cursor pointer is displayed and said electronic light pen is placed thereover, and when said screen is temporarily re-written so as to display unique optical values for each pixel thereon, a locating algorithm of said software will associate said cursor pointer with said electronic light pen; and wherein, when said light pen is moved so as to be associated with another optical value of said gradient of optical values, said software will cause said cursor to move in such a manner as to mimic the speed at which said electronic light pen is being moved.

28. The electronic light pen assembly of claim 21, wherein said lens is a collimating lens.

29. The electronic light pen assembly of claim 28, wherein said electronic light pen further includes a light emitting diode emitter whose output is directed to said collimating lens, and subsequently towards said video display screen;

wherein said video display screen includes photo receptor means to receive and decode light signals emanating from said electronic light pen; and wherein said electronic light pen includes signal generating means to cause specific digital data signals to be transmitted therefrom by means of said light emitting diode emitter.

30. The electronic light pen assembly of claim 21, wherein a prism is interposed between said lens and said red, green, and blue photo sensitive detectors instead of said red, green, and blue color filters.

31. The electronic light pen assembly of claim 21, wherein said electronic light pen further includes pressure sensitive means to provide various output signals within a predetermined range of values, the value of which output signals varies with the pressure exerted by said electronic light pen against said video display screen.

32. The electronic light pen assembly of claim 21, wherein said electronic light pen further includes a wireless radio transmitter for transmitting data signals to said computer.

33. The electronic light pen assembly of claim 18, wherein said electronic light pen further includes a variable length focusing mechanism, whereby the area on said video display screen from which the optical values thereof may be determined may be changed in size and focus by adjustment of said variable length focusing mechanism.

34. A method of locating the position on a video display screen being touched by an electronic light pen;

wherein said electronic light pen comprises light gathering optical means for receiving light emanating from said video display screen, including at least one photo sensitive detector against which said light from said video screen is directed; and circuit means for receiving signals from said at least one photo sensitive detector, for processing said signals, and for transmitting data signals whose value is determined by the light received from said video display screen by said at least one photo sensitive detector at any instant in time;

wherein a computer receives said data signals, and provides information as to the value thereof;

wherein, at any instant in time, said computer and said video display screen are linked together, and said computer includes driver means for writing specific color and/or luminance values to any designated portion of said video display screen; and wherein, at any instant in time, when said electronic light pen is at said position which is adjacent any pixel or group of pixels on said video display screen, a data signal providing information as to the light being received from said pixel or group of pixels is transmitted to mapping software resident in said computer;

said method comprising the steps of:
 (a) momentarily dividing the video display screen into n equal portions, and displaying n mutually exclusive colors or luminance values, one in each of said n equal portions, for at least one screen refresh of said video display screen;
 (b) during said display of n mutually exclusive colors or luminance values, determining the value of said data signal from said electronic light pen, and matching that value to the driver values for said n equal portions on said video display screen so as to determine in which of said n equal portions said position being touched by said electronic light pen is located;
 (c) dividing the matched portion in which said position is being touched by said electronic light pen into n equal portions for at least one screen refresh of said video display screen, and permitting the remaining n−1 original equal portions to revert to any previous or current video image intended to be displayed therein;

(d) during said display of n mutually exclusive colors or luminance values on said matched portion of said video screen display, once again determining the value of said data signal from said electronic light pen and matching that value to the driver values for said n equal portions of said matched portion of said video screen display, so as to determine in which of said n equal portions of said matched portion said position being touched by said electronic light pen continues to be located;

(e) repeating steps (c) and (d) sufficient information as to the pixel or group of pixels being touched by said electronic light pen has been determined, so as to require no further division of the continually smaller matched portion; and (f) determining from said mapping software the exact location of said position on said video display screen as a consequence of the value of the data signal from said electronic light pen as it was at the last iteration of step (e).

35. The method of claim 34, wherein there is at least one photo sensitive detector in said electronic light pen, which at least one photo sensitive detector is capable of distinguishing between two mutually exclusive colors or two mutually exclusive luminance values; and wherein n is equal to 2.

36. The method claim 34, wherein there is at least a monochromatic photo sensitive detector in said electronic light pen, which monochromatic photo sensitive detector is capable of distinguishing among eight mutually distinctive luminance values; and wherein n is equal to 8.

37. The method of claim 36, wherein the values for the mutually exclusive luminance value being displayed on said n equal portions of said video display screen, or said n equal portions of a matched portion thereof, at any instant in time, are 31, 63, 95, 127, 159, 191, 223, and 255, respectively; wherein said values are determined from a table of 0 to 255, where 0 is equal to fully off and 255 is equal to fully on for the driver values for the luminance values on said video display screen being detected by said monochromatic photo sensitive detector.

38. The method of claim 34, wherein there are at least three photo sensitive detectors in said electronic light pen, and each of said three photo sensitive detectors is chosen from the group of photo sensitive detectors comprising red photo sensitive detectors, green photo sensitive detectors, blue photo sensitive detectors, and invisible light photo sensitive detectors;

wherein each photo sensitive detector has a respective red, green, blue, or invisible light color filter associated therewith; and wherein said n mutually exclusive colors being displayed on said n equal portions of said video display screen, or said n equal portions of a matched portion thereof, at any instant in time, are in keeping with the follow table:

|  | FIRST DETECTOR | SECOND DETECTOR | THIRD DETECTOR |
|---|---|---|---|
| COLOR 1 | 255 | 255 | 255 |
| COLOR 2 | 255 | 255 | 0 |
| COLOR 3 | 255 | 0 | 255 |
| COLOR 4 | 0 | 255 | 255 |
| COLOR 5 | 255 | 0 | 0 |
| COLOR 6 | 0 | 255 | 0 |
| COLOR 7 | 0 | 0 | 255 |
| COLOR 8 | 0 | 0 | 0 | where, on a table of 0 to 255, 0 is equal to fully off and 255 is equally to fully on, for the driver values for each of the chosen colors on said video display screen being detected by three of said at least three photo sensitive detectors, respectively.

39. The method of claim 38, wherein there are three photo sensitive detectors in said electronic light pen, which are a red photo sensitive detector, a green photo sensitive detector, and a blue photo sensitive detector, respectively, and each photo sensitive detector has a respective red, green, or blue color filter associated therewith; and wherein said table becomes as follows:

|  | RED DETECTOR | GREEN DETECTOR | BLUE DETECTOR |
|---|---|---|---|
| COLOR 1 - WHITE | 255 | 255 | 255 |
| COLOR 2 - CYAN | 255 | 255 | 0 |
| COLOR 3 - MAGENTA | 255 | 0 | 255 |
| COLOR 4 - YELLOW | 0 | 255 | 255 |
| COLOR 5 - RED | 255 | 0 | 0 |
| COLOR 6 - GREEN | 0 | 255 | 0 |
| COLOR 7 - BLUE | 0 | 0 | 255 |
| COLOR 8 - BLACK | 0 | 0 | 0 |

* * * * *